(12) United States Patent
Liu et al.

(10) Patent No.: US 6,720,519 B2
(45) Date of Patent: Apr. 13, 2004

(54) SYSTEM AND METHOD OF LASER DRILLING

(75) Inventors: Xinbing Liu, Acton, MA (US); Chen-Hsiung Cheng, Chelmsford, MA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/252,630

(22) Filed: Sep. 23, 2002

(65) Prior Publication Data

US 2003/0102291 A1 Jun. 5, 2003

Related U.S. Application Data

(60) Provisional application No. 60/334,334, filed on Nov. 30, 2001, provisional application No. 60/334,416, filed on Nov. 30, 2001, and provisional application No. 60/334,546, filed on Nov. 30, 2001.

(51) Int. Cl.[7] ............................................... B23K 26/36
(52) U.S. Cl. ........................... 219/121.61; 219/121.62; 219/121.67; 219/121.7; 219/121.75; 219/121.77; 219/121.81
(58) Field of Search ........................ 219/121.6–121.62, 219/121.67–121.81, 121.84

(56) References Cited

U.S. PATENT DOCUMENTS 6,555,781 B2 * 4/2003 Ngoi et al. ............ 219/121.67
6,625,181 B1 * 9/2003 Oshemkov et al. ............ 372/9

* cited by examiner

*Primary Examiner*—Samuel M. Heinrich
(74) *Attorney, Agent, or Firm*—Harness, Dickey & Pierce, PLC

(57) ABSTRACT

The present invention is a system for laser micromachining where a scan mirror and milling algorithm are used to produce high precision, controlled hole shapes in a workpiece. A picosecond laser that produces short pulses is used to reduce thermal effects to improve the quality and repeatability of the milled holes, and a Diffractive Optical Element (DOE) is used to split a single beam into a plurality of beams to allow parallel drilling of the workpiece. A method for operating a laser drilling system where high precision, controlled hole shapes in a workpiece are drilled includes using a scan mirror and milling algorithm, and using a picosecond laser in conjunction with a DOE, thus ensuring that spectral bandwidth issues and thermal issues are addressed to improve the quality and repeatability of the holes.

75 Claims, 18 Drawing Sheets

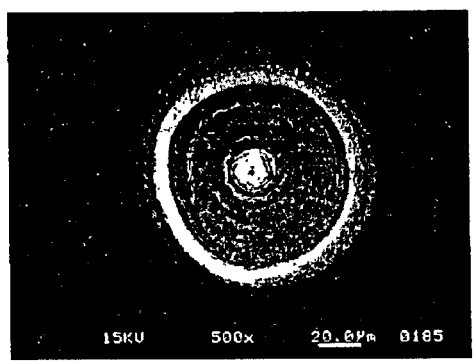 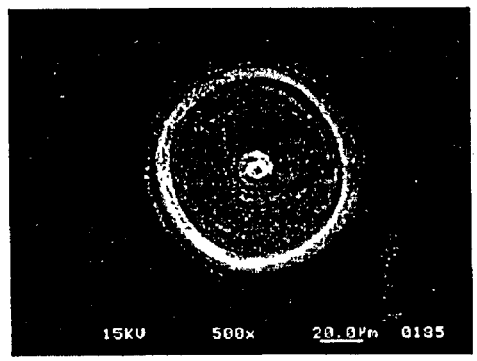
14a  14b

SYSTEM AND METHOD OF LASER DRILLING

CROSS-REFERENCE TO RELATED APPLICATIONS

This application claims the benefit of the following U.S. Provisional Applications: No. 60/334,334, filed on Nov. 30, 2001; No. 60/334,416, filed on Nov. 30, 2001; and No. 60/334,546, filed on Nov. 30, 2001. The disclosures of the above applications are incorporated herein by reference.

FIELD OF THE INVENTION

The present invention generally relates to material ablation with pulsed light sources and particularly relates to laser drilling and laser milling.

BACKGROUND OF THE INVENTION

Material ablation by pulsed light sources has been studied since the invention of the laser. Reports in 1982 of polymers having been etched by ultraviolet (UV) excimer laser radiation stimulated widespread investigations of the process for micromachining. Since then, scientific and industrial research in this field has proliferated—mostly spurred by the remarkably small features that can be drilled, milled, and replicated through the use of lasers.

Ultrafast lasers generate intense laser pulses with durations from roughly $10^{-11}$ seconds (10 picoseconds) to $10^{-14}$ seconds (10 femtoseconds). Short pulse lasers generate intense laser pulses with durations from roughly $10^{-10}$ seconds (100 picoseconds) to $10^{-11}$ seconds (10 picoseconds). A wide variety of potential applications for ultrafast lasers in medicine, chemistry, and communications are being developed and implemented. These lasers are also a useful tool for milling or drilling holes in a wide range of materials. Hole sizes as small as a few microns, even sub-microns, can readily be drilled. High aspect ratio holes can be drilled in hard materials, such as cooling channels in turbine blades, nozzles in ink-jet printers, or via holes in printed circuit boards.

The ability to drill holes as small as microns in diameter is a basic requirement in many high-tech manufacturing industries. The combination of high resolution, accuracy, speed, and flexibility has allowed laser processing to gain acceptance in many industries, including the manufacture of integrated circuits, hard disks, printing devices, displays, interconnects, and telecommunication devices. The need remains, however, for a system and method of laser drilling that solves several problems that continue to exist in the field of material ablation with pulsed light sources.

One problem that continues to exist in the field of material ablation with pulsed light sources relates to use of ultrafast lasers for parallel material ablation to address spectral dispersion issues. Due to the large spectral bandwidth of femtosecond laser sources, there can be problems if one attempts to use femtosecond laser pulses with a diffractive optical element (DOE) as a beamsplitter for parallel processing, e.g., drilling multiple holes simultaneously. This is because the DOE is spectrally dispersive which can cause focus distortion, often severely. This drawback reduces its utility as a commercial manufacturing tool. What is needed is a way to use ultrafast lasers for parallel material ablation to address spectral dispersion issues.

Another problem that continues to exist in the field of material ablation with pulsed light sources relates to control of thermal effects during ablation to improve the quality and repeatability of the holes drilled. Most current drilling techniques perform laser drilling with long pulse, high-energy lasers. The thermal effects that occur when these techniques are used cause the shape of the workpiece holes drilled to be unpredictable and not repeatable. What is needed is a way to control thermal effects during ablation to improve the quality and repeatability of the holes drilled.

Another problem that continues to exist in the field of material ablation with pulsed light sources relates to control drilling precision and the resulting hole shape during laser ablation. For many applications, such as inkjet printer nozzle holes, customers require that holes be drilled having a tapered shape where the input end of the hole is wider than the exit hole. The measurements of the hole (input diameter, exit diameter, and taper) are critical to the product quality and the operation of the end application. For example, the taper of a drilled hole controls the fluid dynamics of an inkjet printer nozzle. The hole measurements for a given product could vary widely and require the ability to adjust for a specific end application. What is needed is a way to control drilling precision and the resulting hole shape during laser ablation.

Another problem that continues to exist in the field of material ablation with pulsed light sources relates to performing parallel drilling of tapered holes. Current methods of laser drilling use excimer lasers to drill tapered holes. Excimer lasers are generally not used with diffractive optical elements as beamsplitters due to the poor spatial beam quality of the excimer laser. Parallel processing with excimer lasers normally require masking techniques to accomplish drilling of multiple holes, which significantly reduces utilization efficiency of the laser light. On the other hand, laser sources with high spatial beam quality can be focused to small beam spots without the use of projection imaging a mask onto the work piece. What is needed is a way to perform parallel drilling of tapered holes.

Another problem that continues to exist in the field of material ablation with pulsed light sources relates to performing high quality laser drilling with metal foils while minimizing thermal effects. Current methods of laser drilling use excimer lasers to drill holes in polymeric materials. Excimer lasers are generally not conducive to drilling high quality holes in metal foils because the long-duration (nanoseconds) excimer pulses can have significant melting in metal foils that leads to poor quality of the holes. What is needed is a way to perform high quality laser drilling with metal foils while minimizing thermal effects.

Parallel processing of laser-milled holes is key to increasing the throughput of, and thus the profitability of laser micromachining. Beam splitting devices such as diffractive optical elements (DOEs) are currently used in laser micromachining to divide a single beam into multiple beams to allow parallel processing. However, hole geometry requirements, and the ability to produce consistent, repeatable results are critical to the individual manufacturing application. Use of beamsplitters introduces technical challenges in maintaining the consistency and repeatability of laser milling. Thus, the need remains for a method of design and apparatus for control of multiple beam intensity distributions that solves several problems that continue to exist in the field of material ablation with pulsed light sources.

One problem that continues to exist in the field of material ablation with pulsed light sources relates to creating multiple holes or shapes in a material that meet customer requirements for hole uniformity and repeatability. Current methods for parallel laser drilling of multiple holes in a workpiece include the use of a conventional diffractive optical element (DOE) to split a single beam into multiple sub-beams. However, because typical DOEs do not produce sub-beams of equal uniformity, the laser drilling system in turn does not provide the consistent, repeatable hole geometry that is required in the marketplace. Consistency and repeatability of multiple holes, and meeting customer specifications for those holes, is critical in micromachining applications. What is needed is a way to create multiple holes or shapes in a material that meet customer requirements for hole uniformity and repeatability.

Another problem that continues to exist in the field of material ablation with pulsed light sources relates to providing beam intensity equalization in a laser drilling system. DOEs are typically designed to divide a single laser beam into multiple beams of equal intensity. However, due to design limitations and manufacturing flaws, many DOEs do not provide equal or sufficiently uniform beam intensities across all sub-beams. If a DOE is not designed to compensate for its design weaknesses, other elements in a laser drilling system must be added or changed to compensate for this deficiency. What is needed is a way to provide beam intensity equalization in a laser drilling system.

Laser milling has historically been done by moving the workpiece with a moveable stage or by moving the laser beam with a galvanometer. Galvanometer scan mirrors are used to direct laser beams for these purposes. However, a periodic wide range of motion is required to keep the mechanical parts within the galvanometer lubricated and operating smoothly. Moveable stages rely on mechanical moving stages, which are slow and thus increase the production cost and decrease the throughput of a laser drilling system. Movements required for laser micromachining, especially micro-hole drilling, are generally very small and very repetitive, and cause premature wear and failure of galvanometer scan mirrors. One solution is to use small range, high-precision scan mirrors with piezo-electric actuators, such as lead zirconate titanate (PZT) actuators. However, high speed, open-loop PZT scan mirrors typically exhibit errors associated with these types of actuators. Thus, the need remains for a method of operating a PZT scan mirror system that solves several problems that continue to exist in the field of material ablation with pulsed light sources.

One problem that continues to exist in the field of material ablation with pulsed light sources relates to performing laser drilling with repeatability and precision. Laser drilling requires that holes be drilled with pre-determined shapes and tapers according to the customer specifications of the workpiece. As technologies advance and smaller components are required for end applications, the precision and accuracy required for manufacturing these components increases. As a result, the margin for manufacturing error in laser drilling has significantly decreased. What is needed is a way to perform laser drilling with repeatability and precision.

Another problem that continues to exist in the field of material ablation with pulsed light sources relates to correcting reflection geometry effects in a PZT scan mirror with high precision. Depending on the reflection geometry of the incident beam relative to the scan mirror, a voltage applied to the actuator that drives X-direction scan produces a different deflection angle from the same voltage applied to the actuator that drives the Y-direction scan. What is needed is a way to correct reflection geometry effects in a PZT scan mirror with high precision.

Another problem that continues to exist in the field of material ablation with pulsed light sources relates to correcting hysteresis inherent in a PZT scan mirror. PZT actuators exhibit hysteresis and drift. In some applications, this is not a problem, but where accuracy and drift-free operation are required, corrections are required. Laser drilling often requires accuracy and precision to the micrometer. What is needed is a way to correct hysteresis inherent in a PZT scan mirror.

SUMMARY OF THE INVENTION

In a first aspect, the present invention is a system for laser drilling where a scan mirror and milling algorithm are used to produce high precision, controlled hole shapes in a workpiece, a picosecond laser that produces short pulses is used to reduce thermal effects to improve the quality and repeatability of the milled holes, and a DOE is used to split a single beam into a plurality of beams to allow parallel drilling of the workpiece.

In a second aspect, the present invention is a method for operating a laser drilling system where high precision, controlled hole shapes in a workpiece are drilled by using a scan mirror and milling algorithm, and by using a picosecond laser in conjunction with a DOE, thus ensuring that spectral bandwidth issues and thermal issues are addressed to improve the quality and repeatability of the holes.

In a third aspect, the present invention is an apparatus to ensure hole uniformity of holes drilled by a laser drilling system using a beam splitter, including a laser source, an efficient beam splitter, and a microfilter that produces sub-beams with essentially the same intensity as each other, where the microfilter compensates for sub-beam variability created by the beam splitter by filtering the transmissivity of the sub-beams.

In a fourth aspect, the present invention is an article of manufacture, which is a microfilter designed to equalize intensity of sub-beams emitted from a beam splitter in a laser drilling system. The microfilter includes a homogenization means to analyze and filter each sub-beam to ensure uniformity of holes drilled by a laser drilling system and meet customer specifications.

In a fifth aspect, the present invention is a method of using a microfilter to ensure uniformity of holes drilled by a laser drilling system using a beam splitter, including: designing a microfilter, fabricating a microfilter, aligning a microfilter, and ensuring that the sub-beam intensity distribution is acceptable.

In a sixth aspect, the present invention is an article of manufacture, which is a microfilter designed to equalize intensity of "binned" sub-beams emitted from a beam splitter in a laser drilling system. The microfilter includes a homogenization means to analyze and filter the binned sub-beams to ensure uniformity of holes drilled by a laser drilling system and meet customer specifications.

In a seventh aspect, the present invention is a method of designing a microfilter used to ensure uniformity of holes drilled by a laser drilling system using a beam splitter, including: determining the intensity distribution of multiple beams, calculating the transmission values of microfilter for individual beams, binning the transmission values, and designing the physical layout of the microfilter.

In an eighth aspect, the present invention is an apparatus for driving the position of a laser beam using a laser drilling system having a scan mirror with PZT actuators, where the PZT moves in the X-Y-Z plane to adjust the beam deflection, and a controller that provides instructions to the PZT to control its movement and directs the laser beam.

In a ninth aspect, the present invention is a method of controlling and correcting PZT movement including determining incident angle, determining reflection correction factors, incorporating correction factors into a tool path algorithm, and operating system with corrections to tool path.

In an tenth aspect, the present invention is a method of controlling and correcting PZT movement including controlling the PZT voltages across the PZT to modify the PZT shape/position, storing the hysteresis curve of that PZT, and using that hysteresis curve to correct hysteresis, and providing feedback to a PZT controller.

In a an eleventh aspect, the present invention is a method of operating an apparatus for precisely driving the position of a laser beam using a laser drilling system, a PZT, and a controller means including the steps of correcting for reflection geometry effects, correcting for hysteresis effects, and providing feedback to the PZT controller in order to accurately execute a tool path algorithm.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 14 is a perspective view depicting hysteresis effects and compensation;

DETAILED DESCRIPTION OF THE PREFERRED EMBODIMENTS

The following description of the preferred embodiment(s) is merely exemplary in nature and is in no way intended to limit the invention, its application, or uses.

The present invention is a method and apparatus for laser drilling to create precise holes to meet pre-determined customer specifications of varied shape. To accomplish this task, a picosecond laser beam is split into a pre-determined number of beams, and a milling algorithm dictates the movement of the beam to create the desired hole geometry.

Figure 1:
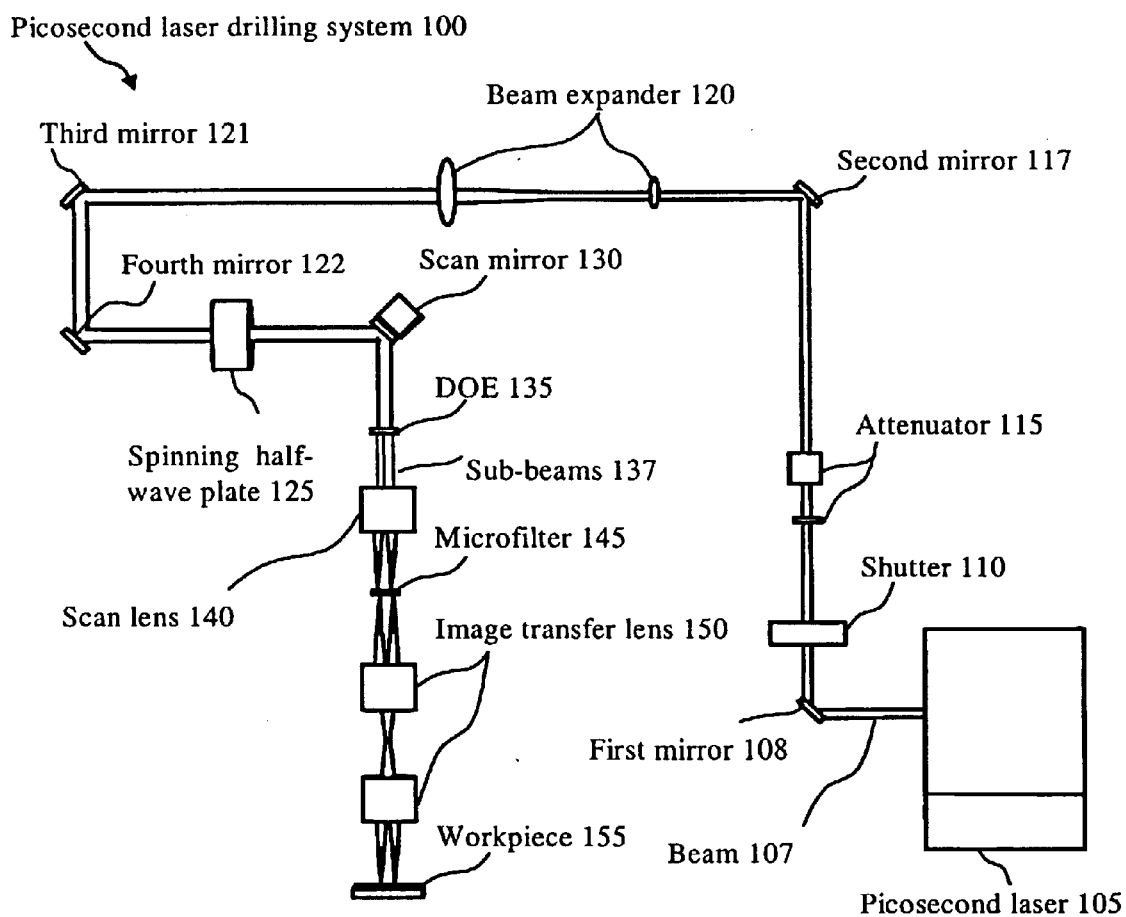
FIG. 1 is a block diagram of a picosecond laser drilling system of the present invention.

Referring to FIG. 1, a picosecond laser drilling system 100, includes a picosecond laser 105, a beam 107, a first mirror 108, a shutter 110, an attenuator 115, a second mirror 117, a beam expander 120, a third mirror 121, a fourth mirror 122, a spinning half-wave plate 125, a scan mirror 130, a diffractive optical element (DOE) 135, a plurality of sub-beams 137, a scan lens 140, a microfilter 145, an image transfer lens 150, and a workpiece 155, arranged as shown.

Picosecond laser 105 provides sufficient pulse energy to ablate material in workpiece 155. The bandwidth of beam 107 emitted from picosecond laser 105 is less than 0.1 nanometer. In one example, the picosecond laser 105 consists of an oscillator and a regenerative amplifier, the oscillator output power equals 35 mW, the pulse width is approximately 15 picoseconds, the regenerative amplifier output power is 1 W at 1 kHz the energy per pulse is 1 millijoule, the power stability is 1.7% over 12 hours, the pointing stability is approximately 1%, and the beam quality $M^2<1.1$. In one example, the desired picosecond pulse width is achieved by the mode-locking mechanism of laser 105, a semiconductor saturable absorber mirror (not shown). Typically a pulse width of between 1 ps and 100 ps is suitable.

First mirror 108, second mirror 117, third mirror 121, and fourth mirror 122 are conventional mirrors used to direct or steer beam 107 along a specified path. Please note that the actual number of mirrors used to steer beam 107 may vary, depending the specific layout of the optical path of the drilling system.

In the present example, shutter 110 is a conventional mechanical shutter made by Vincent Associates, model #LS6ZMZ. The purpose of the shutter is to allow the laser beam from laser 105 to illuminate the work piece 155 when the shutter is in the open state, and prevent the laser beam from illuminating the work piece when the shutter is in the closed state. The shutter is fast enough to open or close in approximately 1 ms. Alternate embodiments of fast shutters include (1) external electro-optic modulators such as a Pockels cell, (2) a galvanometer mirror that deflects the beam out of the desired beam path, or (3) direct modulation of the Q-switch inside laser 105's regenerative amplifier.

Attenuator 115 is a filter that continuously controls the energy outside picosecond laser 105. Attenuator 115, as shown in FIG. 1, includes a half-wave plate, such as one manufactured by CVI Laser, model #QWPO-1053-06-2-R10, followed by a polarizer, such as one manufactured by CVI, model #CPAS-10.0-670-1064. In an alternate embodiment, attenuator 115 is replaced with a fixed density filter to reduce laser energy. In the present invention, passive stabilization is implemented via external attenuator 115. In a second alternate embodiment, attenuator 115 is implemented with a closed feedback loop to provide active stabilization. The current embodiment uses external attenuator 115 to allow picosecond laser 105 to run without interruption in one operating mode. In another alternate embodiment, attenuation of the laser power is obtained within picosecond laser 105 by varying the pump power to its regenerative amplifier.

Beam expander 120 is used in the present invention to match the spot size of beam 107 to the pupil size of scan lens 140. The specifications of beam expander 120 are selected in coordination with the specifications of beam size of picosecond laser 105 and scan lens 140. The laser beam size from beam expander 120 should be the same size or slightly smaller than the pupil size of scan lens 140. One example of a beam expander is made of a pair of negative and positive lenses, with a focal length of −24.9 mm for the negative lens, and 143.2 mm for the positive lens.

Spinning half-wave plate 125 changes the polarization of beam 107 to increase the smoothness of the tapered walls that beam 107 drills. The change in polarization decreases ripples created on the walls of the hole resulting from the laser ablation. An alternate embodiment uses a stationary quarter-wave plate to change the state of polarization of the laser beam from linear polarization to circular polarization. In one embodiment, a half-wave plate, CVI Laser model #QWPO-1053-06-2-R10, spins at 600 RPM driven by an electric motor.

Scan mirror 130 implements a laser milling algorithm (not shown), and guides beam 107 to achieve the desired shape in workpiece 155. The specifications of scan mirror 130 are selected in coordination with scan lens 140 according to the size and shape of the holes to be milled and the material of workpiece 155. In one example, scan mirror 130 is a high-resolution, small-range PZT tip-tilt mirror in the 1-3 mrad scan range. In an alternate embodiment, an X-Y galvanometer scan mirror is used. However, this alternate embodiment has proven to be difficult to implement in situations where only small scan angles are required, such laser milling of inkjet printer nozzle holes, due to rapid galvanometer deterioration resulting from the repetitive minute movements required by picosecond laser drilling system 100.

The implementation of the laser algorithm varies according to alternative embodiments of the present invention. For example, in one alternate embodiment, the scan mirror is replaced with a fixed mirror, and the sub-beams become stationary in space. Instead, the workpiece is mounted on a computer controlled, programmable XY translation stage. The XY stage implements the laser milling algorithm that moves the workpiece to achieve the desired shape in the workpiece by the stationary laser sub-beams. Also, in another alternate embodiment, a scan mirror and an XY stage are used together to implement the laser milling algorithm to achieve the desired shape in the workpiece.

DOE 135 acts as a highly efficient beamsplitter and beam array pattern generator that allows picosecond laser drilling system 100 to drill parallel holes in workpiece 155. In the present invention, DOE 135 is placed in the entrance pupil plane of scan lens 140 (described in the following paragraph). The pattern of sub-beams 137 output by DOE 135 is pre-determined by the specifications of the holes to be drilled in workpiece 155. In an alternate embodiment, an excimer laser with a kinoform could be used in place of DOE 135. However, until the beam quality of the excimer laser improves, this is an impractical solution for precision micromachining. In one example, the DOE splits the single incident laser beam from laser 105 into 152 beams in the forms of 4 rows with 38 beams in each row. (This excimer/kinoform information is from Holmer and Hard's 1995 paper "Laser-machining experiment with an excimer laser and a kinoform" in Applied Optics.)

In the present invention, scan lens 140 is an f-theta telecentric lens. Scan lens 140 determines the spot size of sub-beams 137 upon workpiece 155. The beam size that enters the entrance pupil of scan lens 140 must be less than or equal to the pupil size of scan lens 140. Telecentricity is required to keep the incident angle between sub-beams 137 and workpiece 155 perpendicular, which is necessary to drill parallel holes in workpiece 155. In alternate embodiments where the axes of the holes do not need to be parallel to each other, a non-telecentric scan lens can be used.

Microfilter 145 equalizes the uniformity of sub-beams 137 emitted from picosecond laser 105 and through DOE 135. Microfilter 145 consists of dielectric coatings on a glass substrate, and is custom designed and fabricated according to the intensity patterns of the sub-beams of DOE 135. In one example, microfilter 145 consists of two transmission values, 100% and 98%, in a pattern of 152 individual filters of 4 rows with 38 filters in each row that corresponds to the example given to DOE 135 above.

Image transfer lens 150 maintains image quality, spot size, and telecentricity, while preventing blowback of ablated particles from workpiece 155 onto microfilter 145 by distancing workpiece 155 an additional focal length away from microfilter 145. These ablated particles may damage microfilter 145 due to the proximity between microfilter 145 and workpiece 155. In one example, the image transfer lens consists of two telecentric scan lenses, identical to scan lens 140, placed back to back, with the pupil planes of the two scan lenses coinciding in the middle. Two alternative embodiments can be applied to overcome the problem of blowback of ablated particles onto microfilter 145. In both of these alternatives image transfer lens 150 is not required and workpiece 150 is placed at or near the focal plane of scan lens 140, just behind microfilter 140. In the first alternate embodiment a source of high velocity gas, for example compressed air or dry nitrogen, is formed into a laminar flow sheet that passes between microfilter 145 and workpiece 150. This flow of gas removes blowback particles before they can be deposited onto microfilter 140. In the second alternate embodiment the volume between microfilter 140 and workpiece 150 is filled with a liquid, water for example, that may be flowing. The liquid will reduce the velocity of the blowback particles and carry them out of the ablation region. In both of these cases the gas or the liquid can be specially chosen to enhance the quality of the ablation from the workpiece. The liquid or gas can be either a reactive agent or a catalyst that will enhance the speed of ablation or the quality of the surface remaining after ablation.

Workpiece 155 is the target for picosecond laser drilling system 100. In one example, workpiece 155 is a stainless steel inkjet nozzle foil; however, the present invention may be generalized to a variety of workpiece materials, such as polymers, semiconductor metals, or ceramics. In alternate embodiments, picosecond laser drilling system 100 can drill holes of a wide variety of shapes and tapers in workpiece 155.

In an alternative embodiment microfilter 145 and Image Transfer Lens 150 can be removed from the system and Workpiece 155 placed at the same position as previously occupied by Microfilter 145. In this case the system is significantly simplified and optical alignment errors may be reduced. However, there is a trade-off in performance between the two embodiments which depends largely on the uniformity of intensity of multiple beams created by DOE 135. If DOE 135 is of very high uniformity or if the specifications for the finished workpiece are more relaxed then this alternative embodiment would be preferable. If DOE 135 is not of very high uniformity in the intensity of the multiple beams and the workpiece is required to have very tight tolerances in, for example, the final diameter of a through hole, then the previous embodiment will be preferable.

In operation, picosecond laser 105 emits beam 107 along the optical path identified in FIG. 1 above. Beam 107 propagates along the optical path, where it is incident upon first mirror 108. First mirror 108 redirects beam 107 along the optical path, where it is incident upon shutter 110. Shutter 110 opens and closes to selectively illuminate the work piece material. Beam 107 exits shutter 110 and propagates along the optical path to attenuator 115. Attenuator 115 filters the energy of picosecond laser 105 in order to precisely control ablation parameters Beam 107 exits attenuator 115 and propagates along the optical path, where it is incident upon second mirror 117. Second mirror 117 redirects beam 107 along the optical path, where it is incident upon beam expander 120.

Beam expander 120 increases the size of beam 107 to serve two purposes. First, it increases the beam size for the correct functioning of the DOE 135 as beam splitter. For the DOE 135 to function correctly, the beam size incident upon DOE 135 needs to be big enough to cover several periods of DOE 135. Second, it increases the beam size to match the scan lens pupil size. Beam 107 exits beam expander 120 and propagates along the optical path, where it is incident upon third mirror 121. Third mirror 121 redirects beam 107 along the optical path, where it is incident upon fourth mirror 122. Fourth mirror 122 redirects beam 107 along the optical path, where it is incident upon spinning half-wave plate 125. Spinning half-wave plate 125 changes the polarization of beam 107. Upon exiting spinning half-wave plate 125, beam 107 propagates along the optical path, where it is incident upon scan mirror 130. Scan mirror 130 moves in a pre-defined pattern using a milling algorithm (not shown) to drill the holes in workpiece 155. Scan mirror 130 redirects beam 107 along the optical path, where it is incident upon DOE 135.

DOE 135 splits beam 107 into a plurality of sub-beams 137, which allow parallel drilling of workpiece 155. Sub-beams 137 exit DOE 135 and propagate along the optical path, where they are incident upon scan lens 140. Scan lens 140 determines the spot size of sub-beams 137 upon workpiece 155. Sub-beams 137 exit scan lens 140 and propagate along the optical path, where they are incident upon microfilter 145. Microfilter 145 equalizes the intensities of sub-beams 137. Sub-beams 137 exit microfilter 145 and propagate along the optical path, where they are incident upon image transfer lens 150. Image transfer lens 150 re-images the focal spots of sub-beams 137 onto workpiece 155. Sub-beams 137 ablate workpiece 155 in a pattern according to the pre-defined milling algorithm. In the present embodiment, the image magnification ratio is 1, however, other image magnification ratios may be used in alternate embodiments.

The use of a short pulse (picosecond) laser source in the present invention solves the problem of minimizing excess thermal effects that lead to misshapen and distorted hole shapes. Thermal effects can also cause other undesirable effects, like thermal damage to substrates.

The milling algorithm is defined and communicated to picosecond laser drilling system 100 with a computing means such as a computer (not shown). The computer sends signals to shutter 110 and scan mirror 130 according to the parameters specified in the milling algorithm. The combination of the milling algorithm and scan mirror 130 provides high precision and control of the resulting hole shape in workpiece 155.

Figure 2:
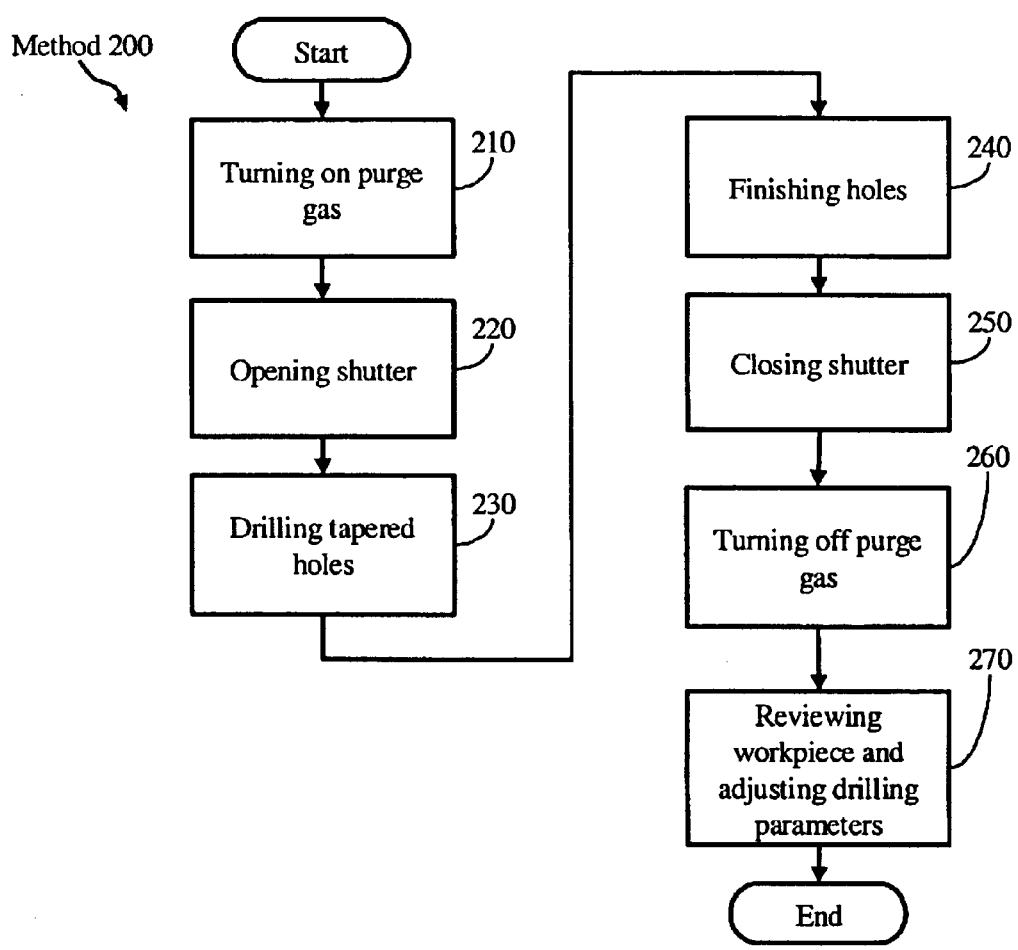
FIG. 2 is a flowchart diagram depicting a method of operating a picosecond laser drilling system of the present invention.

Referring to FIG. 2, a method 200 of operating picosecond laser drilling system 100 includes several steps. At step 210, an operator or automated system opens a gas flow valve to purge workpiece 155 with a gas in order to remove debris generated during laser ablation from a target area. At step 220, shutter 110 opens to allow pulses of laser energy to propagate through picosecond laser drilling system 100 to irradiate the workpiece 155. At step 230, picosecond laser drilling system 100 is targeted on workpiece 155. Ablation of materials occurs as beam 107 propagates along the optical path to the target area of workpiece 155. Specified layers within the target area of workpiece 155 are milled according to a predefined algorithm. The algorithm contains and implements the instructions for executing the required hole shape for the given end use, for example, a tapered hole for an inkjet printer nozzle. At step 240, picosecond laser drilling system 100 completes drilling by using any smoothing or finishing techniques, such as flycutting/trepanning. In this step a straight or a different tapered section of the hole can be obtained. At step 250, shutter 110 closes and drilling ceases. At step 260, purge gas is shut off. At step 270, the operator or automated system uses conventional measurement techniques to determine whether workpiece 155 is within specification. This can be done in-situ, i.e., without removing the workpiece from the workpiece holder but incorporating the measurement device into the drilling setup. Alternately, the workpiece can be removed from the workpiece holder and examined off-line. Based on these measurements, parameters of picosecond laser drilling system 100 are adjusted as needed.

The present invention also comprises a method of designing a microfilter to control and equalize the intensity distribution of multiple laser beams that can be used to produce laser-milled holes in a variety of geometrically repeatable shapes. Further, the process can be used to parallel-process a plurality of milled holes simultaneously.

The present invention uses a microfilter to equalize the intensities of the sub-beams, not as a mask pattern. Typically, the beam size incident upon the microfilter is about 20–100 $\mu$m, while the aperture size of the individual microfilter is 200 $\mu$m or more. The microfilter is aligned so that the sub-beams go through the center of the microfilter aperture and no masking of the sub-beams takes place. The large aperture of the microfilter also allows the sub-beams to move around inside the aperture as is required in laser milling.

Figure 3:
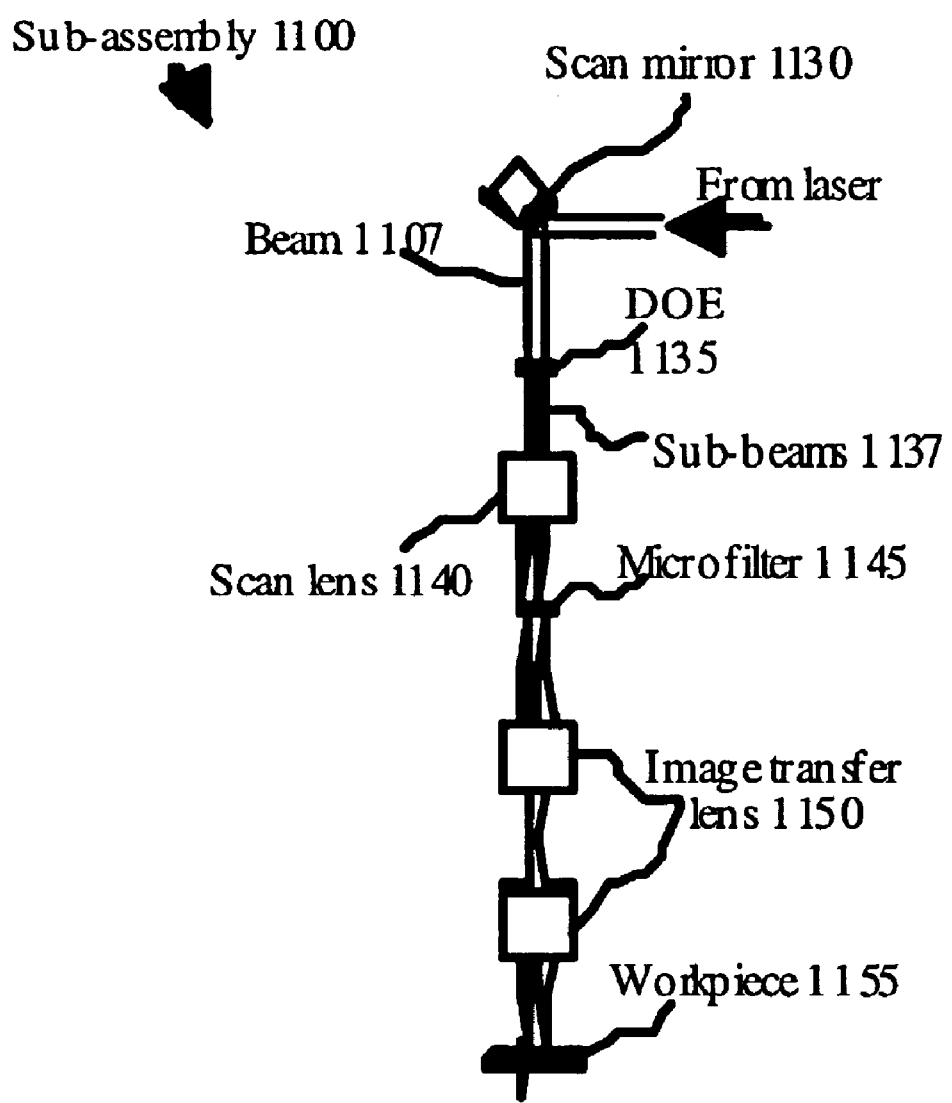
FIG. 3 is a block diagram of a sub-assembly of a laser drilling system.

Referring to FIG. 3, a sub-assembly of a laser drilling system (subassembly) 1100, includes a laser beam 1107, a scan mirror 1130, a diffractive optical element (DOE) 1135, a plurality of sub-beams 1137, a scan lens 1140, a microfilter 1145, an image transfer lens 1150, and a workpiece 1155, arranged as shown. Although the present invention uses a picosecond laser system to generate beam 1107, the present invention may be generalized for use with other laser systems, such as excimer, $CO_2$, and copper vapor laser systems. A brief description of operation of subassembly 100 is provided below. In alternate embodiments, changes in the elements of subassembly 100 may be required.

In operation, beam 1107 is emitted from a laser source (not shown) and propagates along the optical path identified in FIG. 3, where it is incident upon scan mirror 1130. Scan mirror 1130 moves in a pre-defined pattern using a milling algorithm (not shown) to drill the holes in workpiece 1155. Scan mirror 1130 redirects beam 1107 along the optical path, where it is incident upon DOE 1135.

DOE 1135 splits beam 1107 into a plurality of sub-beams 1137, which allow parallel drilling of workpiece 1155. Sub-beams 1137 exit DOE 1135 and propagate along the optical path, where they are incident upon scan lens 1140. Scan lens 1140 determines the spot size of sub-beams 1137 upon workpiece 1155. Sub-beams 1137 exit scan lens 1140 and propagate along the optical path, where they are incident upon microfilter 1145. Microfilter 1145 equalizes the intensities of individual sub-beams 1137 to each other. Sub-beams 1137 exit microfilter 1145 and propagate along the optical path, where they are incident upon image transfer lens 1150. Image transfer lens 1150 re-images the focal spots of sub-beams 1137 onto workpiece 1155. Sub-beams 1137 ablate workpiece 1155 in a pattern according to the predefined milling algorithm.

For many applications, holes of identical geometries are to be drilled in parallel by the sub-beams 1137 in an ideal situation, and generally in practice the geometry specifications are given as an average value and a statistical standard deviation, and/or an absolute range of values that the hole geometry must be within. In one example, DOE 135 generates 400 sub-beams to drill 400 holes in parallel; the holes must have an average diameter of 20 $\mu$m, a standard deviation of $\sigma \leq 0.5$ $\mu$m, and an absolute range of diameters between 18.5 $\mu$m to 21.5 $\mu$m. These specifications put a requirement on the intensity uniformity of sub-beams 1137.

Microfilter 1145 is a specially patterned array of partially reflective filters designed according to the beam intensity pattern of DOE 1135. Microfilter 1145 is located near the focal plane of scan lens 1140, where the beams are separated, to allow a single beam to pass through each microfilter 1145.

Sub-beams 1137 emitted from DOE 135 are of uniformity that is unacceptable to drill uniform holes. Microfilter 1145 is required, to compensate for this lack of sub-beam uniformity, improve sub-beam homogeneity, and enable uniform, repeatable holes to be drilled to meet customer specifications.

Figure 4:
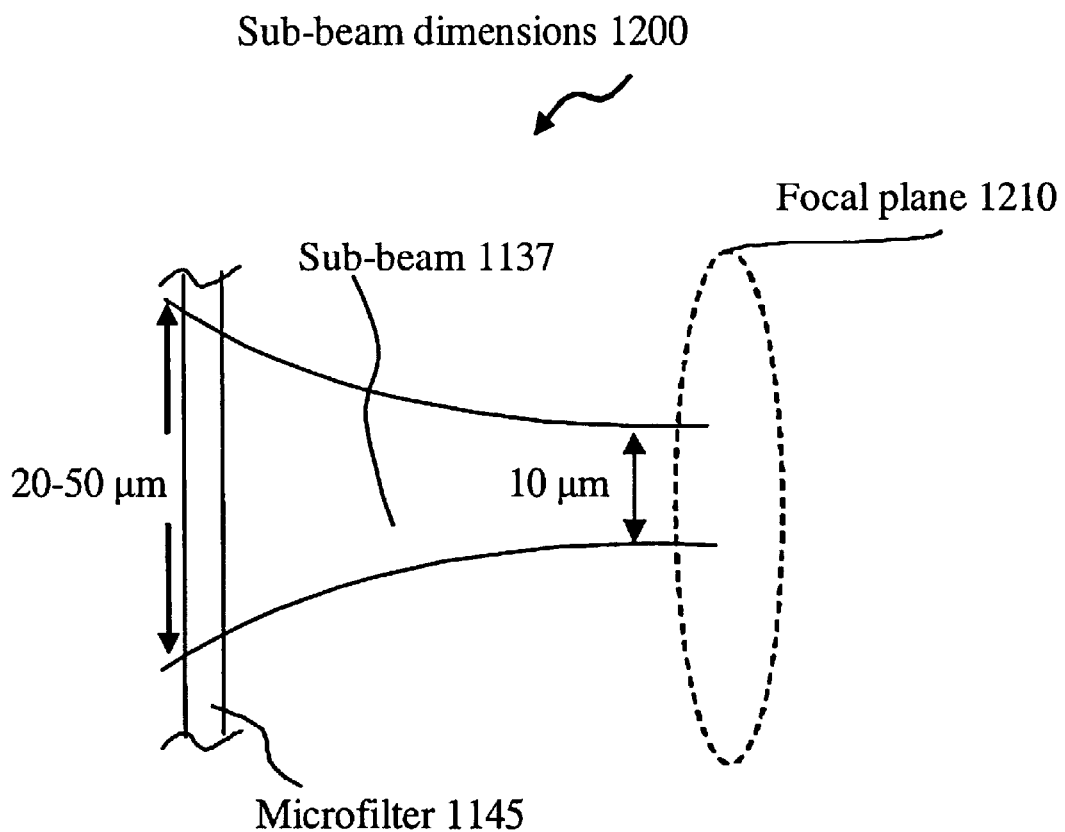
FIG. 4 is a perspective diagram of sub-beam dimensions.

Referring to FIG. 4, sub-beam 1137 passes through a microfilter 1145, and approaches focal plane 1210. FIG. 4 also includes sample dimensions of sub-beam 1137 at various points in the present invention. As shown in the present example, sub-beam 1137 is typically 20 to 50 $\mu$m at the point of incidence upon microfilter 1145. As sub-beam 1137 propagates through microfilter 1145, the width of sub-beam 1137 is decreased to measure about 10 $\mu$m wide as it approaches focal plane 210 before exiting the scope of FIG. 4 and propagating along optical path to image transfer lens 1150.

Figure 5:
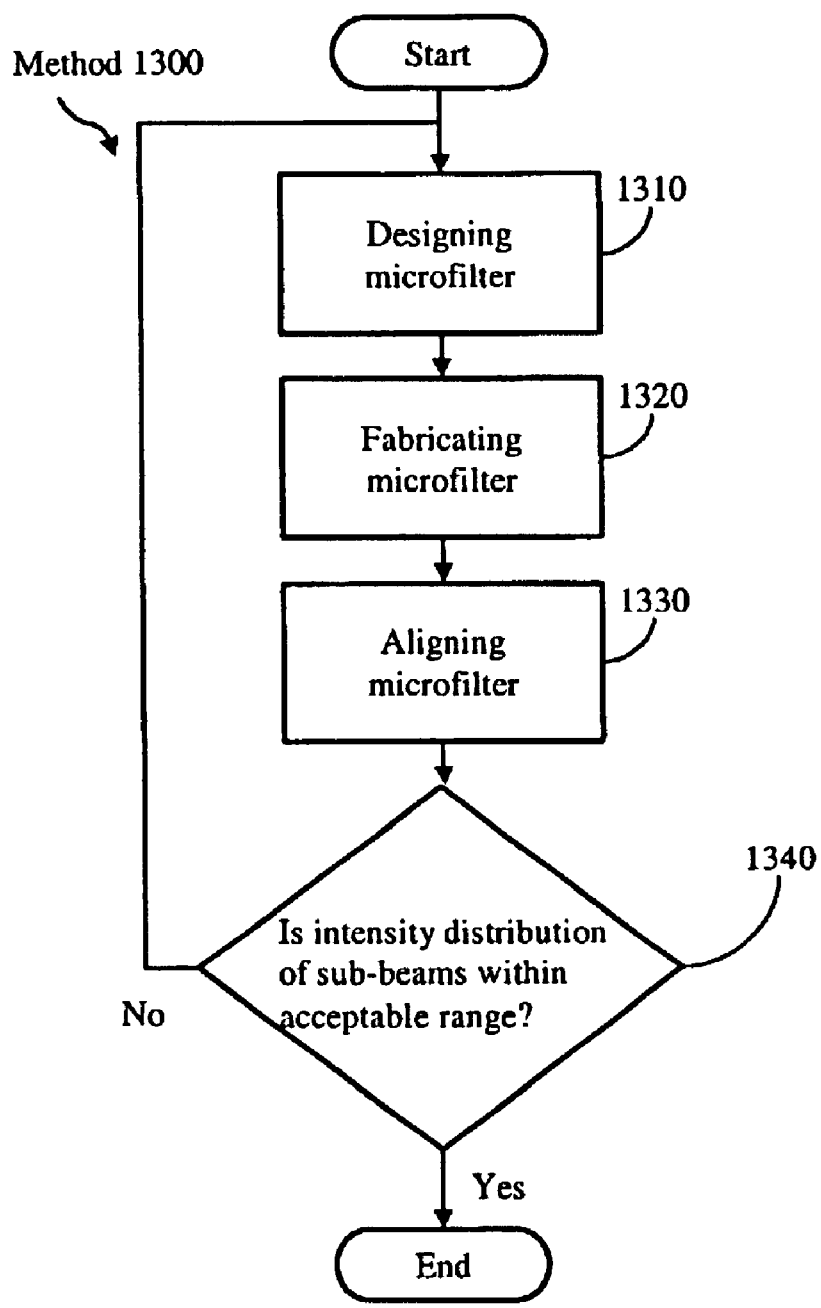
FIG. 5 is a flowchart diagram depicting a method of controlling intensity distribution in a laser drilling system using a microfilter.

Referring to FIG. 5, a method 1300 of controlling intensity distribution in a laser drilling system using a microfilter and includes several steps. At step 1310, an operator, technician, or automated device provides or creates a design for microfilter 1145. A specific method for designing microfilter 1145 is described below with reference to FIG. 6 in method 400. At step 1320, a manufacturer fabricates microfilter 1145 via conventional methods. The design established in step 1310 provides the specifications that guide the manufacturer in producing a microfilter with the proper apertures and coatings to meet those specifications.

At step 1330, an operator, technician, or automated device aligns microfilter 1145 in subassembly 1100 using conventional alignment techniques. Microfilter 1145 is placed near the focal plane of scan lens 1140, but is located sufficiently far from it so that (1) sub-beams 1137 are separate from one another so microfilter 1145 operates properly, but also (2) the spot size of sub-beams 1137 is sufficiently large to avoid damage to microfilter 145. DOE 135 splits beam 1107 into multiple sub-beams 1137 angularly. Because sub-beams 1137 overlap after exiting DOE 1135, microfilter 1145 cannot be located there. However, near focal plane 1210 of scan lens 1140, sub-beams 1137 do not overlap and therefore microfilter 1145 is located there. If microfilter 1145 were placed in focal plane 1210, the light intensity could damage microfilter 1145. As shown in FIG. 4, microfilter 1145 is placed away from the focal plane where sub-beam 1137 size is larger and light intensity is lower to avoid damage to microfilter 1145. Laser beam intensity is inversely proportional to the square of the beam size. In one example, microfilter 1145 is placed in a position where the diameter of sub-beam 1137 is 50 $\mu$m and the diameter of sub-beam 1137 is 10 $\mu$m in the focal plane. In this example, the intensity of the beam is 25 times greater at the focal plane than at the position of microfilter 1145. The placement of microfilter 1145 away from the focal plane is important to minimize damage to microfilter 1145 from magnified intensity of sub-beams 1137 at focal point 1210.

In the current embodiment, the alignment is performed by imaging the whole beam pattern through microfilter 1145. Microfilter 1145 is partially transmissive at the individual microfilter apertures. The remainder of microfilter 1145 is opaque (for example, it can be coated with high-reflectivity dielectric thin films or alternatively, metal films). Therefore, when microfilter 1145 is not aligned correctly, no sub-beams 1137 or only partial sub-beams 1137 can be seen through microfilter 1145 by image transfer lens 1150. In one example, image transfer lens 1150 is a large area CCD camera. The operator of laser system 1100 then moves microfilter 1145 in all three linear dimensions, X-Y-Z, as well as rotation, until all sub-beams 1137 appear on image transfer lens 150. Microfilter 1145 is aligned correctly only when all the sub-beams 1137 are incident upon image transfer lens 1150.

At step 1340, an intensity distribution of sub-beams is measured. These measurements can be done by measuring the light intensity of sub-beams 1137 after microfilter 1145, or, by measuring the drilled holes to ensure the holes meet specifications. If the intensity distribution of sub-beams is sufficiently uniform, method 1300 ends. If not, go to step 1310 to repeat method 1300.

Figure 6:
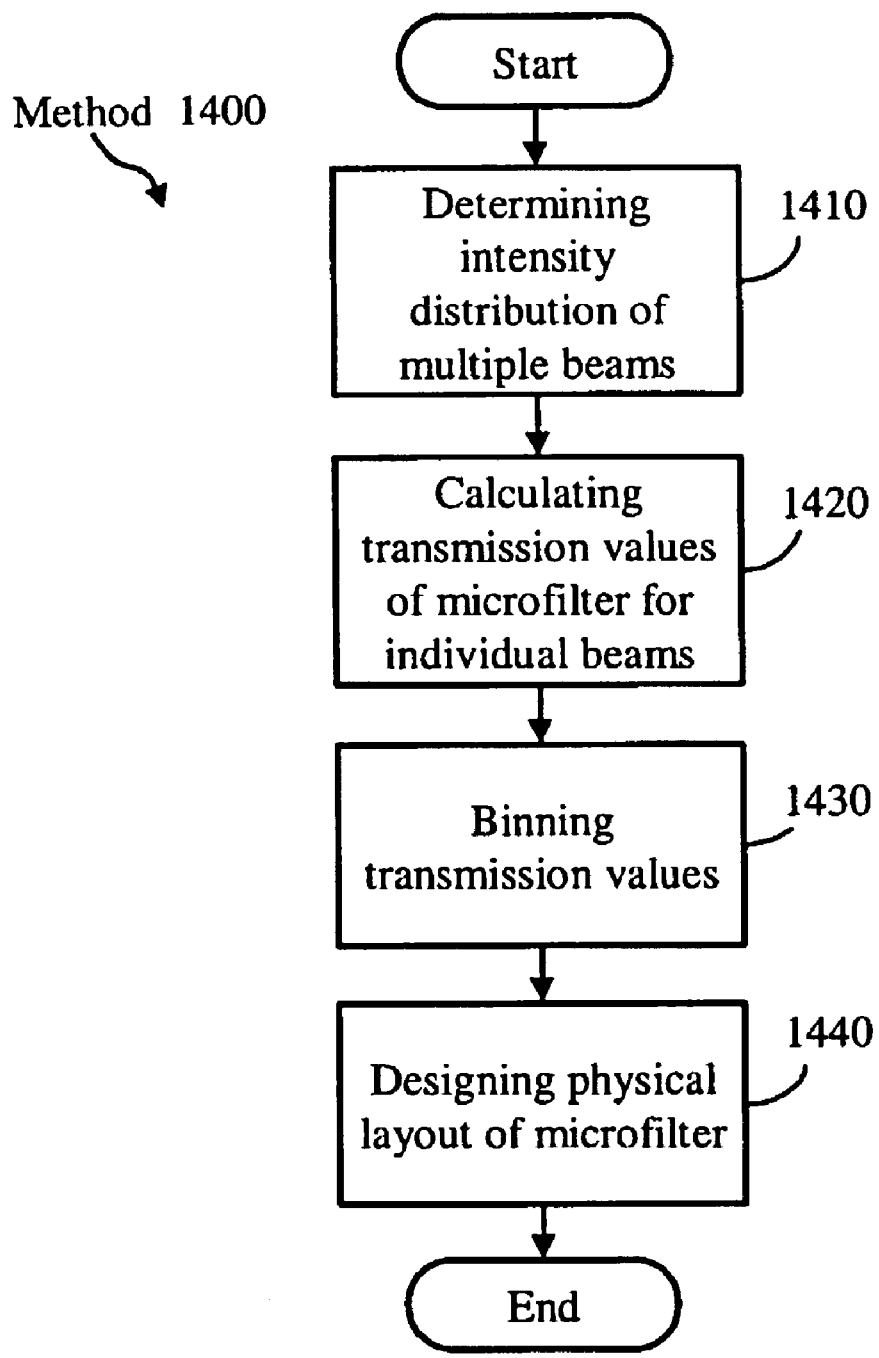
FIG. 6 is a flowchart diagram depicting a method of designing a microfilter.

Referring to FIG. 6, a method 1400 of designing a microfilter includes several steps. At step 1410, an operator, technician, or automated device determines the intensity distribution of sub-beams 1137 upon exiting a beamsplitter (such as DOE 135) based on empirical or theoretical data. The intensity can be measured empirically in subassembly 1100, or can be theoretically calculated based on design specifications for a beamsplitter that produces sub-beams 1137. In the present invention, DOE 1135 is the type of beamsplitter used. However, the present invention may be generalized to be used with any element that produces a set of multiple beams in subassembly 1100. At step 1420, an operator, technician, or automated device calculates transmission values ($T_n$) for the entire intensity distribution referenced in Step 1410 by using Formula A, shown below.

$$T_n = I_{min}/I_n \qquad (A)$$

In Formula A, In is the light intensity of sub-beam n, $I_{min}$ is the weakest beam intensity. This approach results in values that are 1.0 or less for transmission (where $I_{min}=1$ for the weakest beam in the distribution).

At step 1430, the operator or technician pre-determines the number of discrete transmission values to be used in the design of microfilter 1145. This step is important to the reduction in cost of microfilter fabrication. For a DOE that splits the incident beam into N desired sub-beams, Formula A can theoretically give N different transmission values Tn. When N is large, it becomes impractical to try to make microfilter 1145 according to Formula A. Binning provides a way to reduce the number of transmission values to a manageable level.

For less complex arrays (for example, 4×38), the transmission values may be easily determined. In one example, for a DOE 1135 that generates 152 beams in a 4×38 array (see FIG. 7), the normalized intensity distribution of the 152 sub-beams varies from 0.979 to 1.021 (the average intensity is 1.0). An operator uses two transmission values of 1.0 (0% attenuation) and 0.98 (2% attenuation) to equalize the beam intensity distribution. For more complex arrays, such as 8×38, theoretical calculations or computer simulations are used to determine the appropriate transmission values and number of levels for an optimal microfilter design. The present invention is not limited to any specific number of levels and transmission values.

After determining the number of levels and transmission values, the operator, technician, or automated device can sort the intensities of each individual beam, as determined in step 1420, into the various "bins" or discrete transmission values. At step 1440, the operator or technician designs an array layout based upon the binning of beam intensities discussed in step 1430 above.

Figure 7:
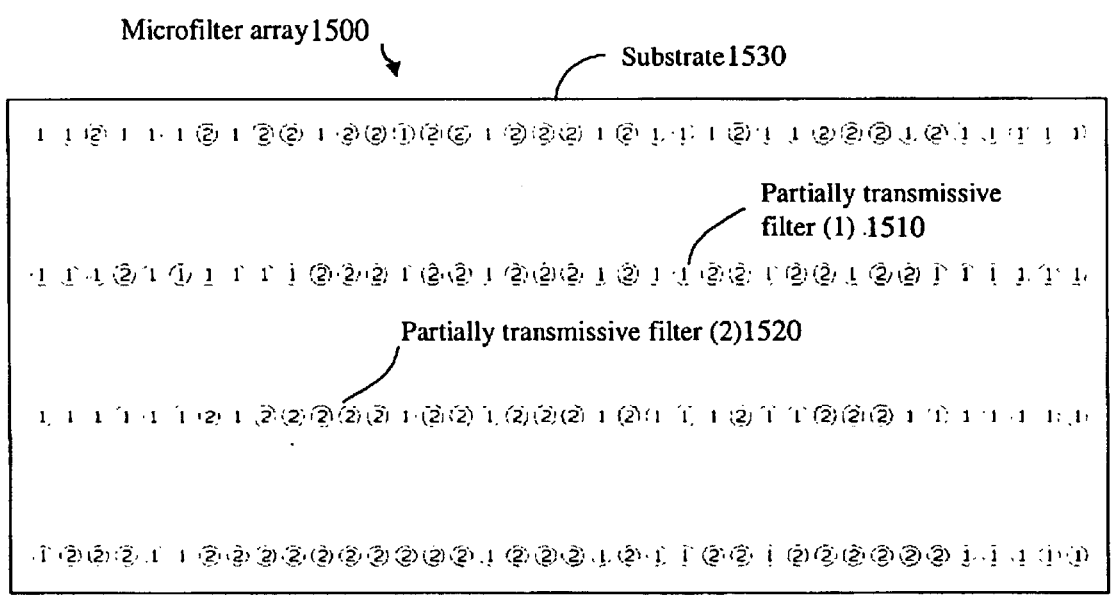
FIG. 7 is a block diagram of a microfilter array layout.

Referring to FIG. 7, a 4×38 microfilter array 1500 for microfilter 1145 includes a partially transmissive filter (1) 1510 and a partially transmissive filter (2) 1520 manufactured upon a substrate 1530. Partially transmissive filters 1510 and 1520 are identified by a (1) or a (2) according to their respective transmission values. In this example, the operator or technician has selected two transmission values that correspond to the (1) and (2) identified in microfilter array 1500. In this example, where the microfilter array is designed to be used with a 4×38 DOE 1135 mentioned above, the (1)s have a transmission of 1.0, and (2)s have a transmission of 0.98. The operator or technician documents the binning performed in step 1430 to provide specifications to a manufacturer. In one example, the documentation is an electronic file, such as a CAD file. However, in alternate embodiments, other documenting processes are used, such as a drawing.

Substrate 1530, in the present invention, is any transparent type material capable of passing light with a minimal or no loss of energy, such as optical glass. Optical coatings may be applied to either or both sides of the substrate to enhance the functionality of microfilter 1145. In one example, a high-reflectivity dielectric thin-film coating (HR coating) is applied to the side where the microfilter array is fabricated. This is to facilitate the alignment procedure in step 1330 described above. In another embodiment, an opaque thin-film metal coating is applied instead of the HR coating. On the other side of the substrate, an anti-reflection dielectric thin-film coating may be applied to reduce light loss due to reflection at the air-glass interface (Fresnel reflection).

In the present example, microfilter array 1500 is designed to match the beam strength DOE 1135 pattern to provide intensity equalization of sub-beams 1137 and thus provide better consistency of hole geometry in workpiece 1155 when performing laser milling. The present invention is not limited to any specific number of array designs.

Figure 8:
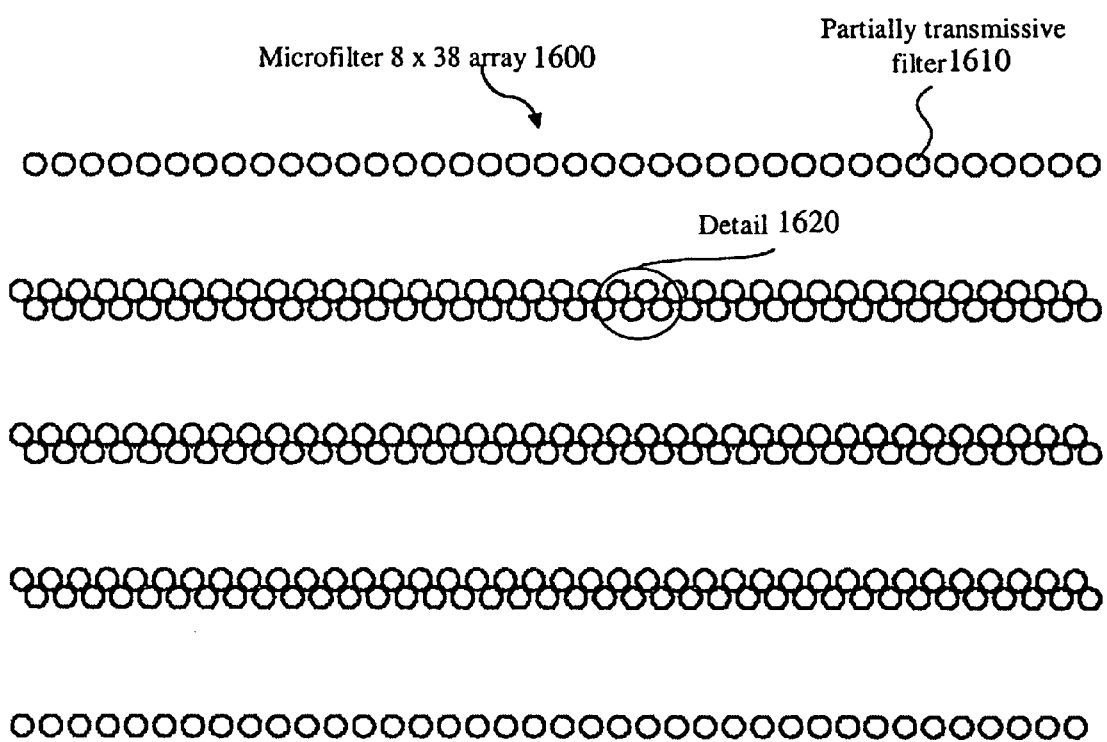
FIG. 8 is a block diagram of a microfilter 8×38 array layout.

Referring to FIG. 8, in a second alternate embodiment, an example of a microfilter 8×38 array 1600 includes a partially transmissive filter 1610 and an area of detail 1620, which is shown below in FIG. 9. In one example, partially transmissive filter 1610 has five discrete transmission values between 0.79 and 1.0. The transmission value for a specific transmissive filter 1610 is assigned by the operator or technician in step 1430.

Figure 9:
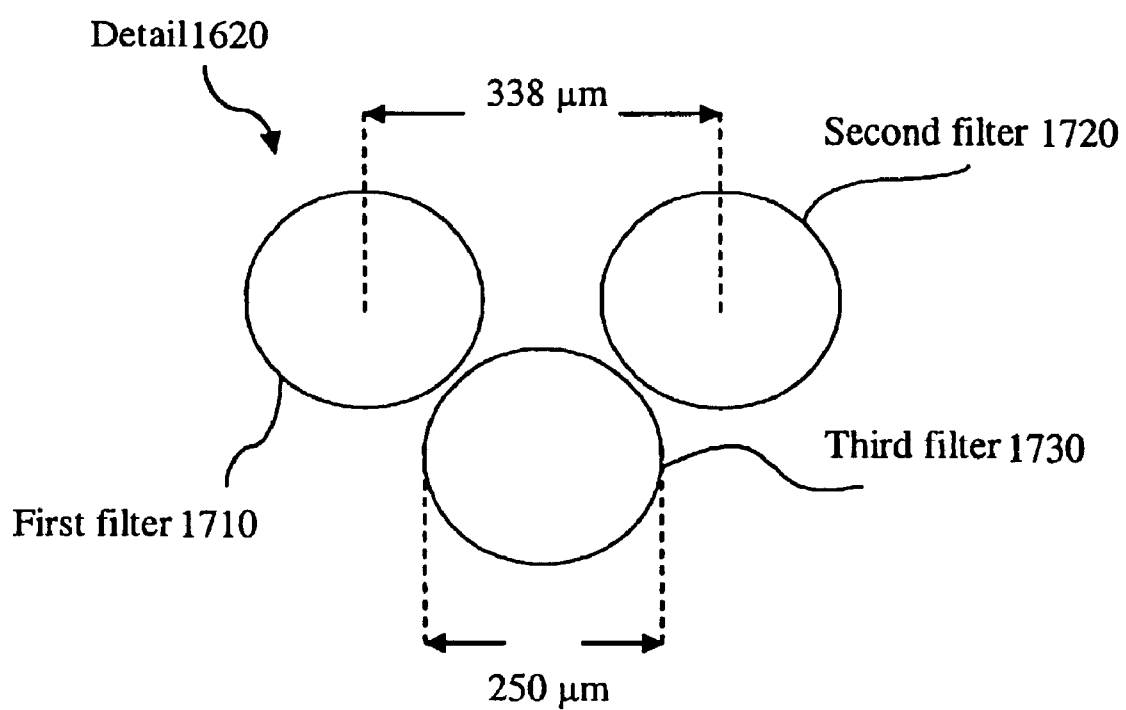
FIG. 9 is a block diagram of an area of detail in a 8×38 microfilter array.

Referring to FIG. 9, an area of detail 1620 includes a first filter 1710, a second filter 1720, and a third filter 1730, all identical in form and function. In the present example, the displaced distance between first filter 1710 and second filter 1720 is 338 μm, however, this distance may range from 50 μm to 5000 μm. Third filter 1730 as shown, is typically 250 μm in diameter, but may be as wide as 1000 μm, or as narrow as 50 μm, depending on the type of array pattern being used. The filter size must be smaller than the sub-beam 1137's center to center distance so that microfilters do not overlap. The filter size must be large enough to allow for the laser milling tool path without the sub-beams 1137 coming into contact with the edges of the individual filters.

The present invention further comprises a method to compensate for two phenomena inherent to the operation of a PZT scan mirror in a laser drilling system. The first problem that requires correction is directional adjustment required to compensate for reflection geometry of the laser beam created by movement of the PZT scan mirror. The second problem that requires correction is a hysteresis effect exhibited by the PZT scan mirror. The present invention uses a first order approximation to calculate correction factors for these effects, which allows a simpler and thus faster solution to be implemented to solve the problem.

Figure 10:
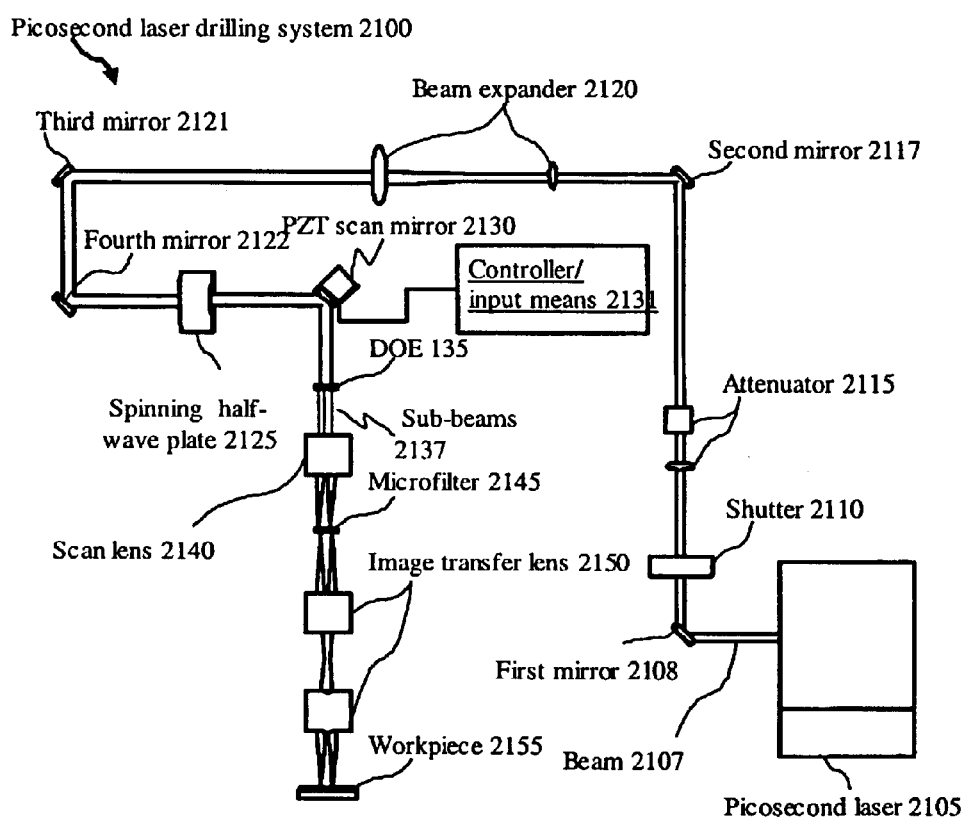
FIG. 10 is a block diagram of a picosecond laser drilling system.

Referring to FIG. 10, a picosecond laser drilling system 2100 includes a picosecond laser 2105, a beam 2107, a first mirror 2108, a shutter 2110, an attenuator 2115, a second mirror 2117, a beam expander 2120, a third mirror 2121, a fourth mirror 2122, a spinning half-wave plate 2125, a PZT scan mirror 2130, a controller/input means 2131, a diffractive optical element (DOE) 2135, a plurality of sub-beams 2137, a scan lens 2140, a microfilter 2145, an image transfer lens 2150, and a workpiece 2155, arranged as shown.

The present invention is illustrated using picosecond laser drilling system 2100, which includes PZT scan mirror 2130. In alternate embodiments, PZT scan mirror 2130 and the present invention are used in conjunction with other laser micromachining systems.

PZT scan mirror 2130 is a commercially available product used to implement a laser-milling algorithm (not shown) to control milling of workpiece 2155. In the present embodiment, specifications of the high-resolution, small range PZT tip-tilt scan mirror 2130 are selected in coordination with scan lens 2140 according to the hole geometry to be milled. In one example, PZT scan mirror 2130 is a series PSH, Piezo Tilting System manufactured by Piezosystem Jena. The current disclosure focuses on PZT scan mirror 2130 and methods of optimizing its operation for precision laser drilling. A brief description of the elements and operation of picosecond laser drilling system 2100 is provided below.

In operation, picosecond laser 2105 emits beam 2107 along the optical path identified in FIG. 10. Beam 2107 propagates along the optical path, where it is incident upon first mirror 2108. First mirror 2108 redirects beam 2107 along the optical path, where it is incident upon shutter 2110. Shutter 2110 opens and closes to selectively illuminate the work piece material. Beam 2107 exits shutter 2110 and propagates along the optical path to attenuator 2115. Attenuator 2115 filters the energy of picosecond laser 2105 in order to precisely control ablation parameters Beam 2107 exits attenuator 2115 and propagates along the optical path, where it is incident upon second mirror 2117. Second mirror 2117 redirects beam 2107 along the optical path, where it is incident upon beam expander 2120.

Beam expander 2120 increases the size of beam 2107 to serve two purposes. First, it increases the beam size for the correct functioning of the DOE 2135 as beam splitter. For the DOE 2135 to function correctly, the beam size incident upon DOE 2135 needs to be big enough to cover several periods of DOE 2135. Second, it increases the beam size to match the scan lens pupil size. Beam 2107 exits beam expander 2120 and propagates along the optical path, where it is incident upon third mirror 2121. Third mirror 2121 redirects beam 2107 along the optical path, where it is incident upon fourth mirror 2122. Fourth mirror 2122 redirects beam 2107 along the optical path, where it is incident upon spinning half-wave plate 2125. Spinning half-wave plate 2125 changes the polarization of beam 2107. Upon exiting spinning half-wave plate 2125, beam 2107 propagates along the optical path, where it is incident upon PZT scan mirror 2130. PZT scan mirror 2130 moves in a predefined pattern using a milling algorithm (not shown), which is contained in controller/input means 2131, to drill the holes in workpiece 2155. Controller/input means 2131 is a device used to direct the movement of PZT scan mirror 2130, such as a computer with software capability to execute the milling algorithm. PZT scan mirror 2130 redirects beam 2107 along the optical path, where it is incident upon DOE 2135.

DOE 2135 splits beam 2107 into a plurality of sub-beams 2137, which allow parallel drilling of workpiece 2155. Sub-beams 2137 exit DOE 2135 and propagate along the optical path, where they are incident upon scan lens 2140. Scan lens 2140 determines the spot size of sub-beams 2137 upon workpiece 2155. Sub-beams 2137 exit scan lens 2140 and propagate along the optical path, where they are incident upon microfilter 2145. Microfilter 2145 equalizes the intensities of sub-beams 2137. Sub-beams 2137 exit microfilter 2145 and propagate along the optical path, where they are incident upon image transfer lens 2150. Image transfer lens 2150 re-images the focal spots of sub-beams 2137 onto workpiece 2155. Sub-beams 2137 ablate workpiece 2155 in a pattern according to the pre-defined milling algorithm.

A first embodiment of the method of operating a PZT scan mirror 2130 includes a method of compensating for reflection geometry that occurs when laser beam 2107 is incident upon and reflects off PZT scan mirror 2130. As PZT scan mirror 2130 tips and tilts in the X-Y plane, the corresponding components of laser beam 2107 are calculated based on the geometry of incident laser beam 2107 and the known deflection angle of PZT scan mirror 2130. A correction factor for the corresponding control voltages can be calculated and implemented using these data.

Figure 11:
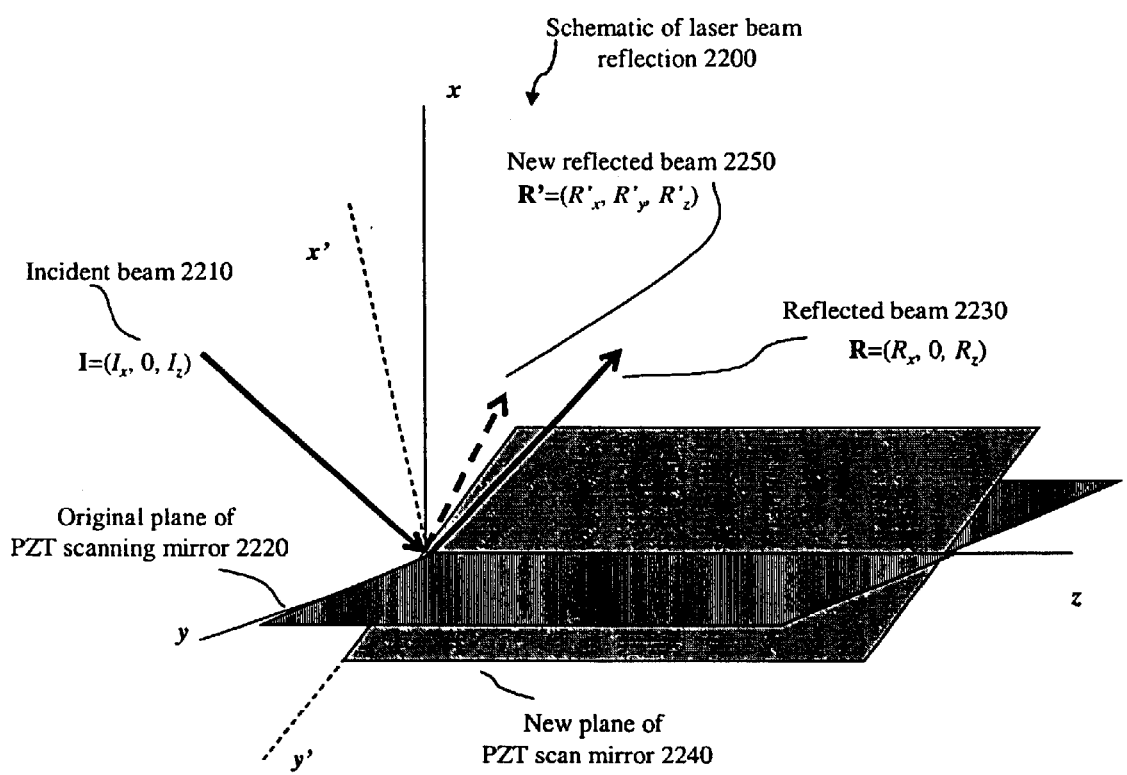
FIG. 11 is a perspective diagram illustrating laser beam incidence and reflection off a PZT scan mirror.

Referring to FIG. 11, a schematic of laser beam reflection 2200 includes an incident beam 2210, an original plane of PZT scan mirror 2220, a reflected beam 2230, a new plane of PZT scan mirror 2240, and a new reflected beam 2250. Schematic of laser beam reflection 2200 illustrates the change in the reflection of laser beam 2107 as the plane of PZT scan mirror 2130 changes during its operation. Incident beam 2210 strikes PZT scan mirror 2130 while in original plane of PZT scan mirror 2220. The result is reflected beam 2230. However, when PZT scan mirror 2130 tips or tilts, resulting in new plane of PZT scan mirror 2240, the result is new reflected beam 2250. Because the X-Y and Z components of reflected beam 2230 change differently even when PZT scan mirror 2130 tips and tilts at the same angle, a correction factor for voltage control of PZT scan mirror 2130 is required.

Figure 12:
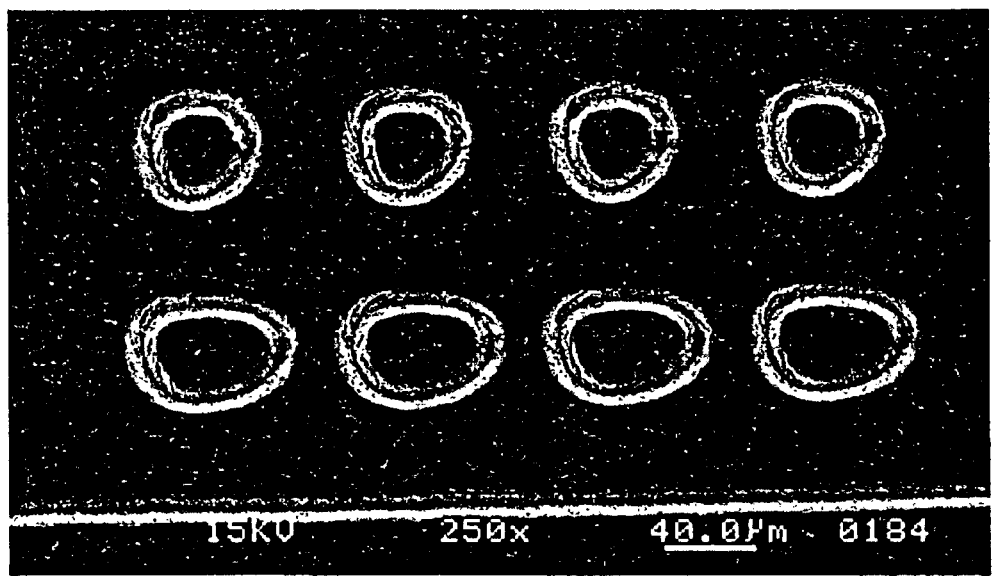
FIG. 12 is a perspective diagram of reflection geometry effect and correction.

Referring to FIG. 12, an example of reflection geometry effect and correction is shown wherein the series of shapes in the bottom row show the "presumed" circular path of the laser with no correction for reflection geometry. The series of shapes in the top row has been corrected for the reflection geometry, and the circles are much rounder. However, the holes are still not completely round, because some residual hysteresis issues still need to be compensated to create more circular holes to meet the desired hole geometry. Hysteresis issues are addressed in a second sub-embodiment, described with reference to FIG. 15, below.

Figure 13:
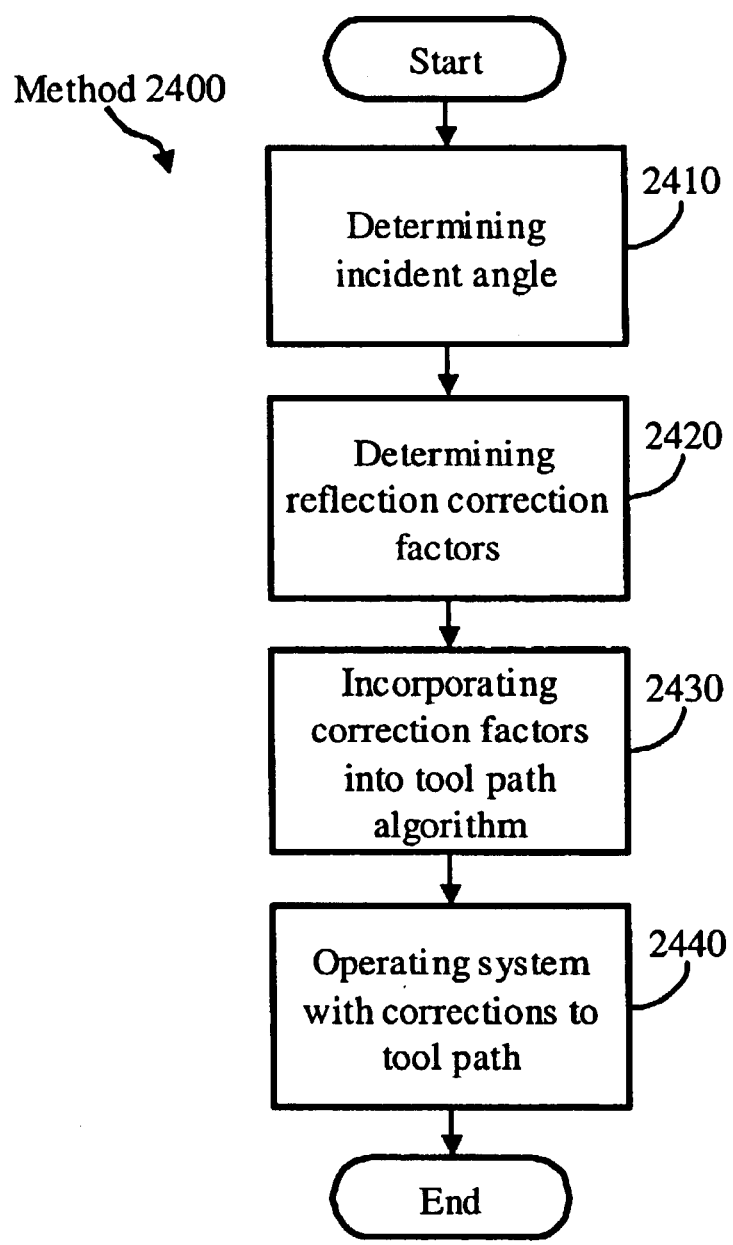
FIG. 13 is a flowchart diagram of a method of correcting reflection geometry in a PZT scan mirror.

Referring to FIG. 13, a method 2400 for correcting reflection geometry in a PZT scan mirror includes several steps. At step 2410, the operator uses controller/input means 2131 to determine the desired "zero-point" incident angle between incident beam 2210 and original plane of PZT scan mirror 2220 according to the system design. The incident angle will be verified using spatial separations between the strike points on three adjacent optics that form a triangle. Another alternative is to mount PZT mirror 2130 on a horizontal rotary stage with angle marking. One can rotate the stage from the normal incidence to any desired angle to within the uncertainty of the angle indices. In one example, the rotational axis is set in the plane of reflective surface of PZT scan mirror 2130. In another example, originally, X angle is 45° and the Y angle is 0°; however, in alternate embodiments, the incident angle ranges from 10° to 80°.

At step 2420, the operator or control system uses knowledge of the angle between incident beam 2210 and original plane of PZT scan mirror 2220, the angle between original plane of PZT scan mirror 2220 and new plane of PZT scan mirror 2240, and vector geometry to determine appropriate correction factors for voltages used to control PZT scan mirror 2130.

In one example, PZT scan mirror 2130 is a series PSH, Piezo Tilting System manufactured by Piezosystem Jena. This model includes three independent x, y, z PZT actuators (not shown) to allow tip-tilt scan mode operation, and has a tilting angle range of 2 mrad. In the present invention, the operator uses controller/input means 2131 to apply voltage to the x, y actuators while the z actuator is fixed. In alternate embodiments, PZT scan mirror 2130 may operate using one, two, or all three actuators. The present invention is not limited to a tilting angle range of 2 mrad; however, to achieve larger tilting angles, a thicker and more expensive PZT scan mirror 2130 is required. Alternatively, this correction technique also can be applied to any 2-D scan mirror with other driving mechanisms, such as a galvanometer.

According to the principles of reflection, and in reference to FIG. 11 above, the unit vectors of incident beam 2210, normal of mirror and reflected beam 2230 satisfy the following vector equations (1) and (2):

$$R = I - 2(I \cdot x)x \qquad (1)$$

$$R' = I - 2(I \cdot x')x' \qquad (2)$$

In equations (1) and (2), x and x' are the normal unit vectors of original plane of PZT scan mirror 2220 and new plane of PZT scan mirror 2240, respectively, and/is the unit vector of incident beam 2210. Only the situation where the mirror is tilted and rotated about the z-axis as is shown in FIG. 11 will be discussed. Tipping and rotating about the y-axis will not be addressed in this disclosure for it is well known as the direct conclusion of the law of reflection.

Scalar products are used to determine the projection of new reflected beam 2250. The angle between original beam 2230 and new reflected beam 2250 can be determined using the following scalar products equation (3):

$$\cos(\Delta\psi_y) = R \cdot R' = 1 - 2(I \cdot x)^2 - 2(I \cdot x')^2 + 4(I \cdot x)(I \cdot x')(x \cdot x') \quad (3)$$

The operator uses controller/input means 2131 to calculate those scalar products using the following equations:

$$x \cdot x' = \cos(\Delta\theta_x)$$

$$I \cdot x = \cos(\alpha)$$

$$I \cdot x' = I \cdot x \cos(\Delta\theta_x) = \cos(\Delta\theta_x)\cos(\alpha)$$

In these three equations, $\alpha$ and $\Delta\theta$ represent the incident angle of incident beam 2210 and the tilting angle of the mirror (between original plane of PZT scan mirror 2220 and new plane of PZT scan mirror 2240), respectively.

Using the above three scalar products and the angles of $\Delta\theta$ and $\alpha$ to express equation (3), the equation can be simplified to (4):

$$\cos(\Delta\psi_y) = 1 + 2\cos^2(\alpha)[\cos^2(\Delta\theta_x) - 1] \quad (4)$$

When the tilting angle is sufficiently small, $\Delta\theta_x \ll 1$, the following first order approximation is used:

$$\Delta\psi_y = 2\cos(\alpha)\Delta\theta_x + O((\Delta\theta_x)^3) \quad (5)$$

When the residual error is estimated to be on the order of 0.01% (if $\Delta\theta$ is less than 10 mrad) it is sufficient to further simplify the equation to (6):

$$\Delta\psi_y = 2\cos(\alpha)\Delta\theta_x \quad (6)$$

If originally the incident beam is normal to the PZT mirror, $\alpha$ is zero and thus:

$$\Delta\psi_y(\alpha=0) = 2\Delta\theta_x \quad (7)$$

This special case also can be directly deduced from the law of reflection. Law of reflection or equation (7) is also the general solution for the case where the reflection mirror is tilted about the y-axis.

$$\Delta\psi_x = 2\Delta\theta_y \quad (8)$$

In a more general situation where the PZT mirror is both tipped and tilted, the reflection response follows equation (6) in the Y direction but equation (8) in the X direction. The present invention compensates for the difference between equations (6) and (8).

In order to achieve desired reflection angle changes of $\Delta\psi_x = \Delta\psi_y = \Delta\psi$, the mirror will need to be tipped and tilted by varying amounts as shown in equations (6) and (8). For a given tilting angle $\alpha$, the correction factor is $\cos(\alpha)$. Namely, $$\Delta\theta_y / \Delta\theta_x = \cos(\alpha) \quad (9)$$

At step 2430, the operator uses controller/input means 2131, calculates $\cos(\alpha)$, and incorporates the correction factors into the software program that controls the tool path algorithm (not shown). In one example, with a tilting angle of $\alpha$ within ±10 mrad of 45°, it is sufficient to use the constant factor $1/\sqrt{2}$ to multiply the tipping angle $\Delta\theta_y$ of PZT mirror in the tool path to accomplish the geometric correction. At step 2440, the operator uses controller/input means 2131 to execute a tool path algorithm (not shown) to control picosecond laser drilling system 2100 and produce the specified hole geometry in workpiece 2155 using the correction factors identified in step 2420. In one example, PZT scan mirror 2130 operates in open-loop mode for faster scan speeds, where resonant frequencies are in the multi-kHz range. In an alternate embodiment, PZT scan mirror 2130 operates in closed-loop mode; however, these devices are considerably slower in response, as they operate in the sub-Hz range.

Method 2400 uses a first order approximation to calculate correction factors for these effects on subsequent orders. This allows a simpler, faster solution to be implemented to solve the problem. Higher order corrections do not significantly impact the result of the overall correction factor and thus are not required. First order approximation offers a faster, elegant solution because the factors are calculated and then there are no further calculations required.

A second sub-embodiment of the method of operating a PZT scan mirror 2130 is a method of compensating for the inherent hysteresis in PZT scan mirror 2130. A correction factor is calculated based on empirical measurements of voltage and system performance. Coordinates are multiplied by the correction factor before being communicated to PZT scan mirror 2130 via controller/input means 2131 that controls the milling algorithm.

Hysteresis is a phenomenon in which the response of a physical system to an external influence depends not only on the present magnitude of that influence but also on the previous history of prior movement within the system. PZT scan mirrors exhibit hysteresis with respect to changes in the voltage that powers the movement of the device. Hysteresis is evident in the present invention when making calculations to determine how much to move PZT scan mirror 2130 to drill the required hole in workpiece 2155. Without hysteresis corrections, holes cannot be drilled repeatedly to meet specified hole geometry.

Referring to FIGS. 14a and 14b, an example of hysteresis effects and compensation is shown. FIG. 14a clearly shows the hysteresis effects have deformed the desired circular geometry. After the hysteresis effects have been compensated, the defects can be almost totally eliminated as illustrated in FIG. 14b.

Figure 15:
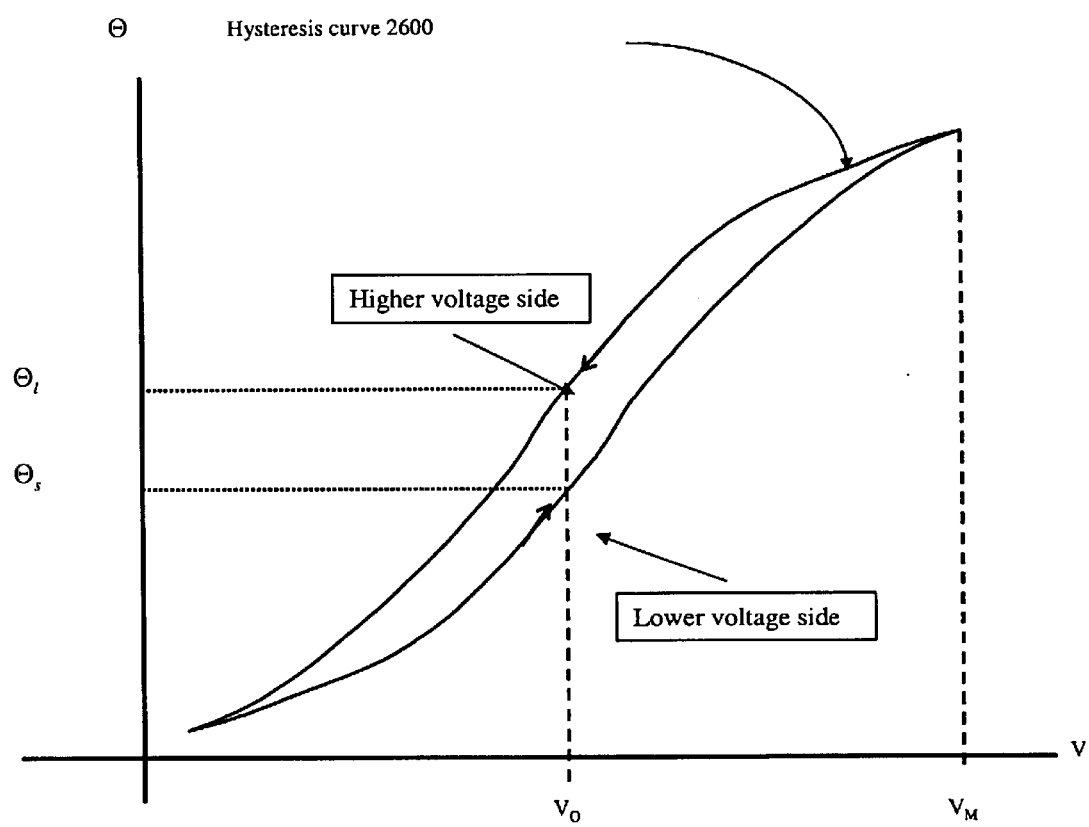
FIG. 15 is a graph of a Hysteresis curve.

Referring to FIG. 15, a hysteresis curve 2600 illustrates how the driving voltage that controls PZT scan mirror 2130 changes with increases or decreases in the voltage value, and further, is history-dependent. By using a system with a low driving voltage, the hysteresis effect is minimized and little to no correction is required. However, when the driving voltage requirement to PZT scan mirror 2130 is increased, the hysteresis effect grows larger and more complex to resolve. FIG. 15 illustrates that the effects of hysteresis changes with varying voltages V. The following factors are considered to compensate for hysteresis effects. When the drive voltage V approaches $V_O$ from different directions on the hysteresis curve, deflection angles, $\Theta_l$ and $\Theta_s$, are different for the same drive voltage. In other words, the voltage response is not unique. Furthermore, this disparity between $\Theta_l$ and $\Theta_s$ monotonically increases as the maximum drive voltage $V_M$ in the hysteresis curve increases (not shown). Prior maximum drive voltage, $V_M$, reached by PZT scan mirror 2130 determines the hysteresis curve the current loop shall follow. Varying $V_M$ gives a different path (hysteresis curve). Finally, $\Theta_l(V)$ and $\Theta_s(V)$ are not linear.

Once the contributing factors to hysteresis effects are understood, a remedy can be applied. To achieve high levels of consistency from one drilling run to another, the same $V_M$ history needs to be established before every machining. To compensate for the disparity between $\Theta_l$ and $\Theta_s$, the operator overdrives the PZT stack in a controlled, nonlinear fashion. The compensation factor can be empirically determined.

Figure 16:
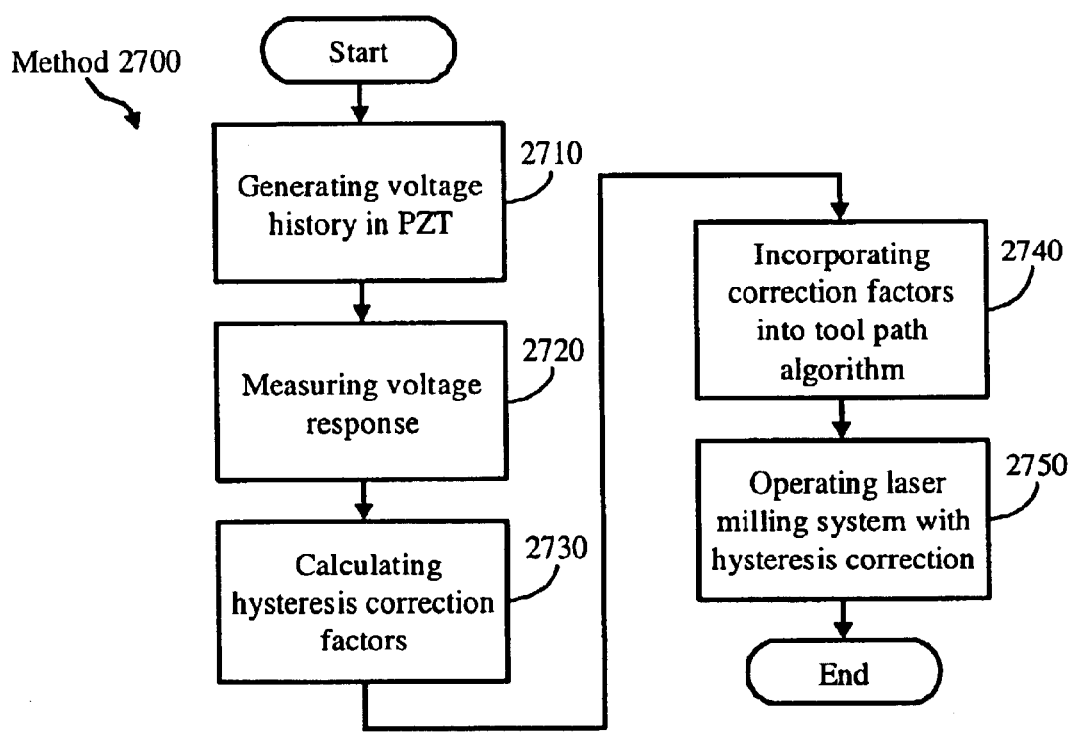
FIG. 16 is a flowchart diagram depicting a method of correcting for hysteresis.

Referring to FIG. 16, a method 2700 of correcting for hysteresis inherent to operating PZT scan mirror 2130 in picosecond laser drilling system 2100, includes several steps. At step 2710, the operator uses controller/input means 2131 to direct PZT scan mirror 2130 to create a voltage history within the device. The voltage starts at the origin of the hysteresis curve ($V_x$ and $V_y=V_0$) shown in FIG. 15, and then the operator uses controller/input means 2131 to increase and decrease the voltage to create a known history of voltage and response of PZT scan mirror 2130. During this step, it is critical that the maximum and minimum voltages for the drilling run are achieved at least once. Repeating the voltage history more than once is desirable although once is generally acceptable. This step adds some additional time to the drilling process, but it is critical that the voltage history is consistent for each drilling to ensure that the device response is established and known for the subsequent correction factors to work properly.

At step 2720, the control system empirically measures and captures the voltage responses, $\Theta_t(V)$ and $\Theta_s(V)$, in PZT scan mirror 2130 as movements are executed in step 2710. This information is used by the operator or control system to realize the hysteresis curve for PZT scan mirror 2130. The purpose of establishing the hysteresis curve for PZT scan mirror 2130 is to calculate the hysteresis compensation factor that is identical for each and all drillings. At step 2730, the operator uses controller/input means 2131 to calculate hysteresis correction factors based on the voltage responses, $\Theta_t(V)$ and $\Theta_s(V)$, captured in step 2720. In theory, since the $\Theta_t(V)$ and $\Theta_s(V)$ are measured, the inverse functions, $V_t(\Theta_t)$ and $V_s(\Theta_s)$ would provide the exact voltage to achieve the desired deflection angles. In practice, $\Theta_t(V)$ and $\Theta_s(V)$ are only measured at a few discrete voltages. As a result, the inverse functions of $V_t(\Theta_t)$ and $V_s(\Theta_s)$ also are only known for a few discrete deflection angles. A linear interpolation between adjacent angles is used to complete the hysteresis curve without direct measurements. To further simplify the operation, an empirical approximation with required correction factors is developed. For the desired $\Delta V_M$, the ratio of deflection angles on higher and lower voltage sides of the center voltage, $V_O$, is calculated based on the measurement in step 2720.

The first compensation factor can be calculated by taking the difference square root of the deflection ratio. Explicitly, $$f = 1 - \sqrt{\left|\frac{\Theta(V_o + \Delta V_M)}{\Theta(V_o - \Delta V_M)}\right|} \quad (10)$$

This factor f is used to counteract the imbalance between the deflection angles by simple multiplication and linear scaling to the drive voltage. Since the deflection change per unit voltage change is always smaller at the higher voltage side, f is positive with magnitude less than one. The desired approximation needs to satisfy two boundary conditions and one guideline. ($\Delta V_M$ is a change in $V_M$, the maximum voltage.)

At the limit of $V \rightarrow \pm \Delta V_M$, the approximation totally compensates for the imbalance between the low and high voltage sides as indicated in FIG. 15. On the other hand, at the limit of $V \rightarrow 0$, there should be no compensation. The magnitude of compensation should increase from zero monotonically as $|V|$ increases. A first order, or linear, approach is designed to meet those requirements. The actual drive voltages, $V_s$ and $V_l$, can be expressed in the following equations with V as the uncompensated or original voltage.

$$V_s = \cdot\left(1 - f \cdot \frac{V}{\nabla V_M}\right) \quad (11)$$

$$V_l = \frac{V}{1 - f \cdot \frac{V}{\nabla V_M}} \quad (12)$$

Although the compensation factor defined by equation 10 is sufficient for some applications, an additional iteration can provide an improved f factor for further hysteresis correction. (Meaning of "additional iteration": implement hysteresis correction as defined by Equation 10, and examine the drilling results, if the drilling result is not good enough, i.e., there is still residual hysteresis, do the hysteresis correction as outlined again).

These factors are applied to compensate for the hysteresis effects in directing the movement of PZT scan mirror 2130. Within PZT scan mirror 2130, the range of $V_x$ and $V_y$ is typically from 10 to 70 volts with $V_O=40$ volts, and the f factor typically range from 0.02 to 0.15; however, these values are highly dependent on the severity of hysteresis exhibited by PZT scan mirror 2130.

An alternate embodiment uses a lookup table to store past discrete hysteresis coordinates. As in the previous embodiment, linear interpolation between adjacent angles is used to complete the hysteresis curve without direct measurements. However, the computer code required to solve for hysteresis using a lookup table is more complex and slower in execution than the present invention. This alternate embodiment can be used when the effect of hysteresis is severe or if hysteresis correction requirements become more stringent.

At step 2740, the operator uses controller/input means 2131 to incorporate the correction factors into the software program that directs the milling operation using tool path algorithm (not shown). In one example where circular holes are required, full hysteresis correction factors are 8% in the X-direction and 12% in the Y-direction, where the driving voltage ranges from 10–70 V, rather than providing circular coordinates to PZT scan mirror 2130. The lower correction factor in the X-direction is due to the reduction in drive voltage by the reflection geometry correction. At step 2750, the operator or control system executes the tool path algorithm to control picosecond laser drilling system 2100 and produce the specified hole geometry in workpiece 2155 using the correction factors identified in step 2740.

Method 2700 uses a first order approximation to calculate correction factors for the hysteresis effects. This allows a simpler and thus faster solution to be implemented to solve the problem. Higher order corrections do not significantly impact the result of the overall correction factor and thus are not required. First order approximation offers a faster, elegant solution because the factors are calculated and no further calculations are required.

In a third alternate embodiment, both methods are used to correct for hysteresis and reflection geometry. However, because the order of calculation of the correction factors for hysteresis and geometry effects is not significant, this embodiment is not described in detail. Either method can be executed first with equal results. For example, if hysteresis factors are calculated prior to the geometry factors, the values resulting from the hysteresis calculations are accounted for within the geometry formulas. The geometry factors are then calculated and the final correction factors are identical to those calculated by determining geometry factors first.

A nozzle plate of an ink-jet head may be constructed with the laser drilling system of the present invention as further detailed below.

Figure 17:
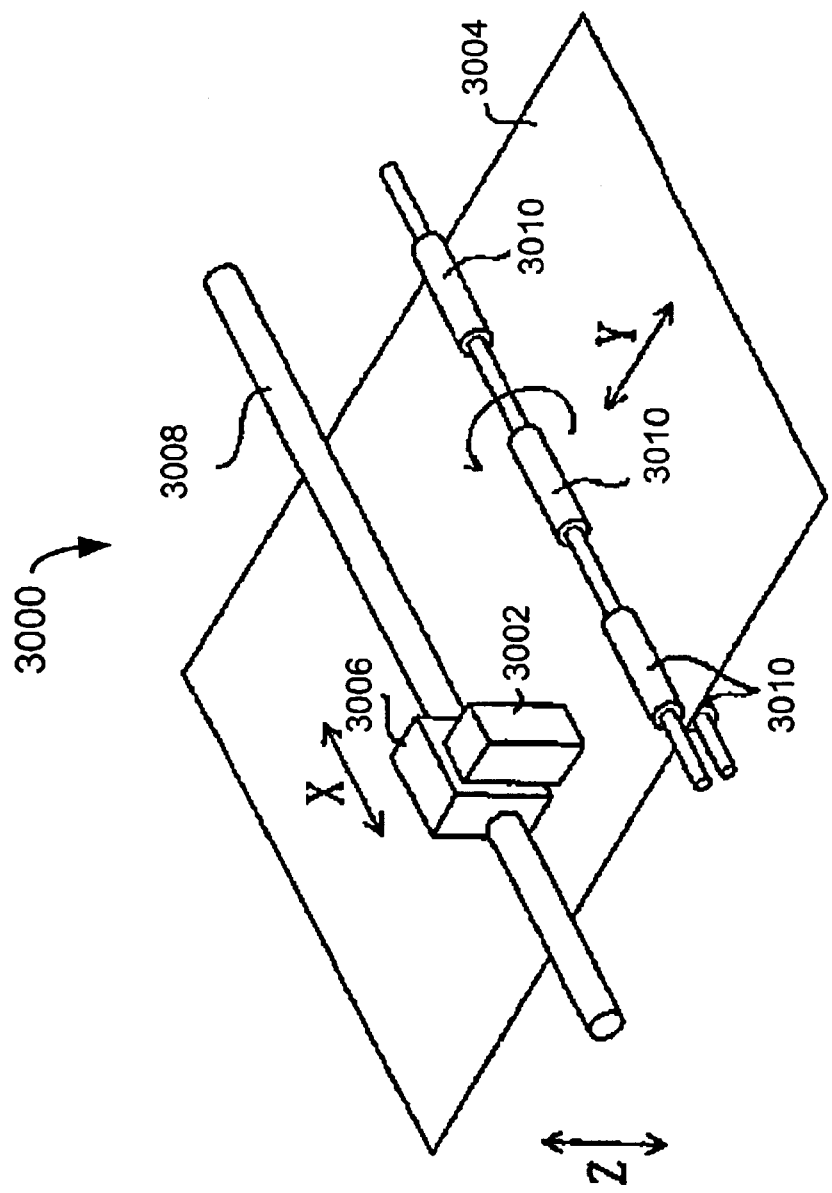
FIG. 17 is a perspective view showing major constituent components of an ink-jet printer.

As shown in FIG. 17, an ink-jet printer 3000 has an ink-jet head 3002 capable of recording on a recording medium 3004 via a pressure generator. Ink droplets emitted from the ink-jet head 3002 are deposited on the recording medium 3004, such as a sheet of copy paper, so that recording can be performed on the recording medium 3004. The ink-jet head 3002 is mounted on a carriage 3006 capable of reciprocating movement along a carriage shaft 3008. More specifically, the ink-jet head 3002 is structured such that it can reciprocate in a primary scanning direction X in parallel with the carriage shaft 3008. The recording medium 3004 is timely conveyed by rollers 3010 in a secondary scanning direction Y. The ink-jet head 3002 and the recording medium 3004 are relatively moved by the rollers 3010.

Figure 18:
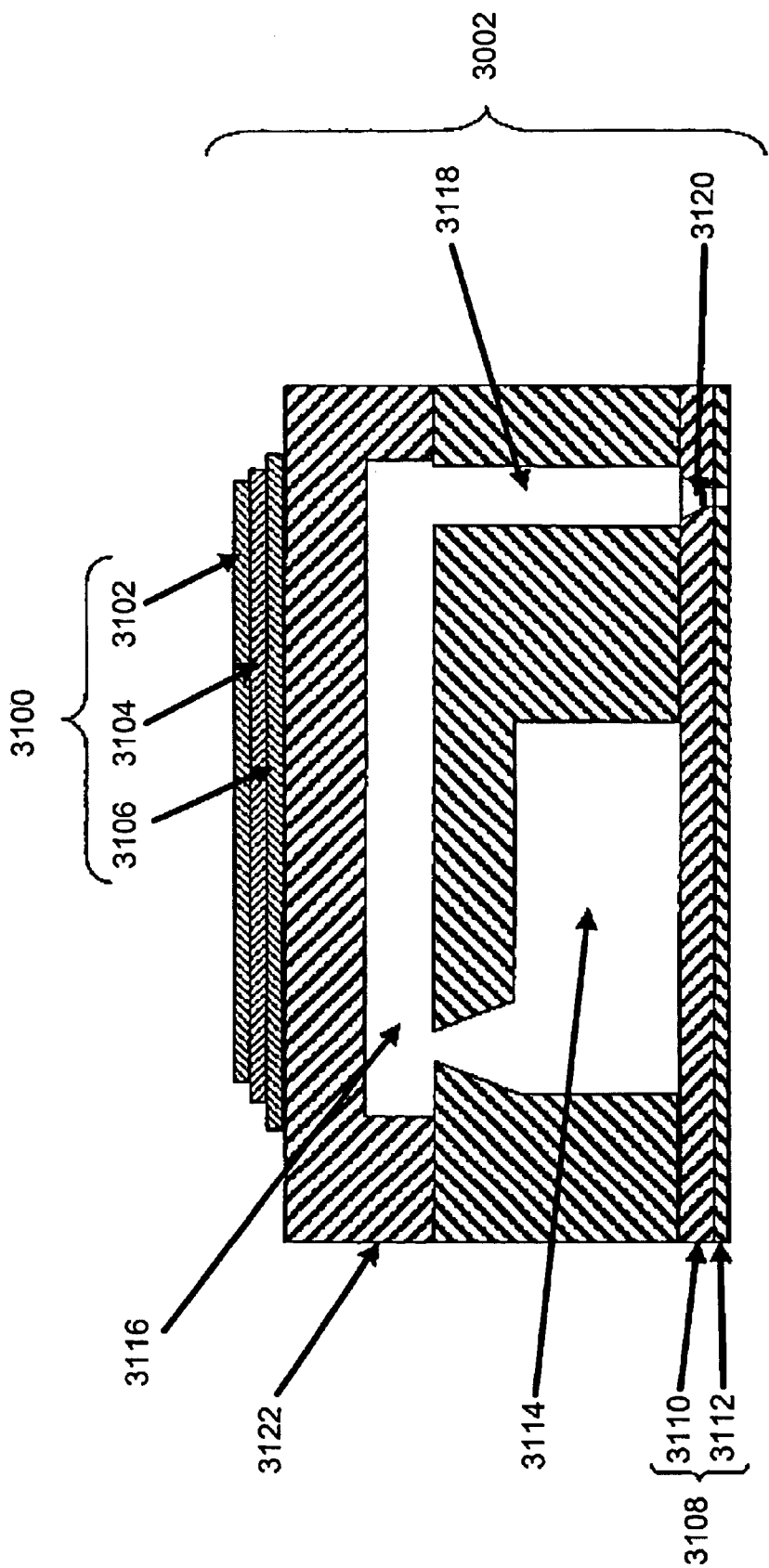
FIG. 18 is a schematic cross-sectional view of an ink-jet head.

Referring to FIG. 18, a pressure generator 3100 is preferably a piezoelectric system, a thermal system, and/or equivalent system. In this embodiment, the pressure generator 3100 corresponds to a piezoelectric system which comprises an upper electrode 3102, a piezoelectric element 3104, and an under electrode 3106. A nozzle plate 3108 comprises a nozzle substrate 3110 and a water repellent layer 3112. The nozzle substrate 3110 is made of metal, resin, and/or equivalent material. The water repellant layer 3112 is made, for example, of fluororesin or silicone resin. In this embodiment, the nozzle substrate 3110 is made of stainless steel and has a thickness of 50 um, and the water repellent layer 3112 is made of a fluororesin and has a thickness of 0.1 um. The ink-jet ink is filled in an ink supplying passage 3114, a pressure chamber 3116, an ink passage 3118, and a nozzle 3120. Ink droplets are ejected from the nozzle 3120 as the pressure generator 700 pushes the pressure chamber element 3120. As a result of the present invention, very good nozzles are formed without flash and foreign matter (carbon etc) in the nozzle plate. Further, the accuracy of the nozzle outlet diameter is 20 um±1.5 um.

The present invention has several advantages. A first advantage of the present invention is that it uses short pulse lasers for parallel material ablation. A second advantage of the present invention is that it provides a way to control thermal effects during ablation to improve the quality and repeatability of the holes drilled. A third advantage of the present invention is that it provides a way to control drilling precision during laser ablation. A fourth advantage of the present invention is that it provides a way to perform parallel drilling of tapered holes. A fifth advantage of the present invention is that it provides a way to perform laser drilling with metal foils. A sixth advantage of the present invention is that it provides high efficiency of laser light utilization by employing a loss-less, phase-only diffractive optical element as multiple beam generator for parallel drilling. A seventh advantage of the present invention is that it provides a way to produce high quality finish holes with smooth walls. An eighth advantage of the present invention is that it provides a way to minimize collateral damage to workpiece. A ninth advantage of the present invention is that it decreases production costs through the ability to parallel-drill tapered holes. A tenth advantage of the present invention is that it can produce articles of manufacture that can be of predetermined shape and function that are of use as nozzles for inkjet printer mechanisms.

One disadvantage of the present invention is that lower average power is emitted by picosecond lasers; however, this is compensated by the fact that the peak power is very high.

There are other ways to solve the problem(s) addressed by the present invention. A first other way to solve the same problem is to use a conventional, long pulse lasers such as high power copper vapor laser, CO2, or excimer laser for drilling; however, this solution is problematic for precision drilling a metal workpiece with the desired precision and quality due to the long pulse duration of these lasers (tens of nanoseconds), even the short wavelength excimer laser, that cause thermal effects in the metal workpiece. A second other way to solve the same problem is to use a femtosecond laser system; however, femtosecond lasers cannot be used with a DOE as a beam splitter to generate a pattern of sub-beams over a significant area over the workpiece for parallel drilling due to the broad spectral bandwidth of the femtosecond laser and the spectral dispersion of the DOE. Because the holes would be drilled one at a time, production time would be excessive. Thus, use of a femtosecond laser is not practical as a commercial manufacturing tool unless the number of holes to be drilled is very small.

There are additional advantages of the present invention. An eleventh advantage of the present invention is that it meets customer-required hole geometries. A twelfth advantage of the present invention is that it provides beam intensity equalization in a laser drilling system. A thirteenth advantage of the present invention is that it compensates for sub-beam intensity non-uniformity that leads to ablation non-uniformity common with diffractive optical elements. A fourteenth advantage of the present invention is that it is a compact design.

The present invention also has some additional disadvantages. A second disadvantage of the present invention is that it's efficiency is dependant on the distribution of the diffractive optical element. A third disadvantage of the present invention is that it is a non-programmable device.

There are also additional ways to solve the same problem. A third other way to solve the same problem is to manufacture a binary mask having opaque areas to block light beams, and completely transmissive areas to pass light beams that can be inserted close to the workpiece at the appropriate time. However, multiple masks with different patterns would be required, making the system more complex. This approach also requires more complicated alignment procedures for each mask to be used. A fourth other way to solve the same problem is to perform laser milling without the microfilter in two passes. Initially the laser system is used to produce non-uniform hole geometry ensuring that the maximum hole size does not exceed specification. In a second drilling pass, a single beam (or a few beams whose intensities can be adjusted individually) is used to enlarge smaller holes drilled by weaker beams in the first drilling system. However, this method is time consuming and adds to the complexity of the laser drilling system.

The present invention has further advantages. A fifteenth advantage of the present invention is that it performs laser drilling with repeatability and precision. A sixteenth advantage of the present invention is that it corrects reflection geometry effects in a PZT scan mirror. A seventeenth advantage of the present invention is that it corrects hysteresis inherent in a PZT scan mirror. A eighteenth advantage of the present invention is that it prevents degradation of a scan mirror in a laser system. A nineteenth advantage of the present invention is that the first order approximation approach used to calculate and implement correction factors is faster than using a look-up table method due to the simple computer programming required. A twentieth advantage of the present invention is the flexibility of the solution. Changes in laser system equipment and hole geometry result in correction factor changes that are simple to incorporate into the software code. Implementing corrections using hardware (e.g., closed-loop feedback or more expensive optical elements) are more complex and expensive. A twenty-first advantage of the present invention is the low cost of the solution. The present invention provides a software solution to the hysteresis and reflection geometry effects. A hardware solution using closed-loop feedback or more expensive elements to solve the same problems would add significantly to the cost of the overall laser drilling system. A twenty-second advantage of the present invention is that it is much faster than a closed-loop hardware solution that could be used to solve the hysteresis and reflectivity problems. A closed-loop system can only move about two times per second. This speed is not a viable solution for use in a high-throughput manufacturing environment.

The present invention also has further disadvantages. A fourth disadvantage of the present invention is the additional time required to pre-calibrate the PZT for the hysteresis calculation prior to drilling each unit. However, the amount of time needed to pre-calibrate should not significantly impact the manufacturing throughput of the laser drilling system, and significantly improves the quality of the product. A fifth disadvantage of the present invention is the potential degradation of the PZT scan mirror due to repeated, minute movements. However, measurements of PZT scan mirror wear during development activities indicate that the mirror is likely to last more than 100 years.

There exist other ways to solve the same problem(s) addressed by the present invention. A fifth other way to solve the same problem is to use a closed-loop PZT scan mirror. However, such a closed-loop system is much slower due to the time required to process and feedback the voltage information. This solution is also more expensive than open-loop solution of the present invention. A sixth other way to solve the same problem is to use a larger range PZT scan mirror stack to reduce hysteresis via low PZT scan mirror operating voltage. This would keep the voltage on the hysteresis curve close to the Vx axis, where the lines are nearly linear, thus minimizing the impact of hysteresis. However, high-range PZTs are cost prohibitive and very large. A seventh other way to solve the same problem is to relocate the actuators of the PZT scan mirror by 45° to eliminate the reflection geometry distortion. However, the control and computations required to accomplish this are more complex. An eighth other way to solve the same problem is to use a galvanometer to guide the laser on the workpiece in place of the PZT scan mirror. However, this is difficult to implement due to the galvanometer deterioration from the repetitive and minute movements during laser milling.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A picosecond laser micromachining system comprising:
   a picosecond laser operable to produce a laser beam to illuminate a workpiece;
   a beam path describing a route of the laser beam from said picosecond laser to the workpiece;
   a diffractive optical element intersecting the beam path and operable to diffract the laser beam, thereby producing a plurality of sub-beams illuminating at least one workpiece; and
   a microfilter intersecting at least two sub-beams of the plurality of sub-beams and operable to equalize uniformity of the plurality of sub-beams.

2. The system of claim 1 further comprising a scan mirror intersecting a beam path of the laser beam and operable to guide the laser beam to achieve a desired shape in the workpiece.

3. The system of claim 2, wherein said scan mirror is driven by piezo-electric actuators.

4. The system of claim 3, wherein said piezo-electric actuators are lead zirconate titanate actuators.

5. The system of claim 2, wherein said scan mirror is operable to implement a laser milling algorithm.

6. The system of claim 1, further comprising a moveable workpiece holder.

7. The system of claim 6, wherein said moveable workpiece holder is operable to implement a laser milling algorithm.

8. The system of claim 1 further comprising a shutter intersecting the beam path and operable to control illumination of the workpiece with the laser beam.

9. The system of claim 1 further comprising an attenuator operable to control energy of the laser beam.

10. The system of claim 1 further comprising a scan lens intersecting a sub-beam and operable to determine a spot size of the sub-beam upon a workpiece.

11. The system of claim 10, wherein the workpiece is disposed essentially in a focal plane of said scan lens.

12. The system of claim 10 further comprising a beam expander intersecting the beam path and operable to match a beam size of the laser beam to a pupil size of said scan lens.

13. The system of claim 10, wherein said scan lens corresponds to an f-theta telecentric lens.

14. The system of claim 1 further comprising a spinning half-wave plate intersecting the beam path and operable to modify a polarization of the laser beam, thereby increasing smoothness of tapered walls drilled in the workpiece via the laser beam.

15. The system of claim 1 further comprising a stationary quarter wave plate intersecting the beam path and operable to change a state of polarization of the laser beam from linear polarization to circular polarization.

16. The system of claim 1 further comprising an image transfer lens operable to increase distance of the workpiece from the microfilter an additional focal length while maintaining image quality, spot size, and telecentricity, thereby preventing blowback of ablated particles from the workpiece onto the microfilter.

17. The system of claim 16, wherein the workpiece is placed essentially in an image plane of said image transfer lens.

18. The system of claim 1 further comprising a source of high velocity gas formed into a laminar flow sheet and passing between said microfilter and said workpiece.

19. The system of claim 1 further comprising a liquid filling a volume between said microfilter and said workpiece.

20. The system of claim 1 further comprising a plurality of mirrors to determine the beam path by redirecting the laser beam onto the workpiece.

21. A method of producing a laser milled workpiece with a picosecond laser system, the method comprising:
   producing a picosecond laser beam;
   diffracting the picosecond laser beam, thereby illuminating at least one workpiece with a plurality of sub-beams; and
   performing a traversal of an exposed surface of the workpiece with the sub-beams, thereby ablating the exposed surface.

22. The method of claim 21 further comprising directing a purging gas onto the exposed surface, thereby removing debris generated during ablation of the exposed surface.

23. The method of claim 21 further comprising drilling a tapered hole.

24. The method of claim 23 further comprising reviewing the laser milled workpiece, thereby determining whether the laser milled workpiece conforms to specifications.

25. The method of claim 24 further comprising adjusting elements of the picosecond laser drilling system based on said reviewing, thereby producing an adjusted picosecond laser drilling system.

26. The method of claim 25 further comprising drilling a tapered hole in a workpiece with the adjusted picosecond laser drilling system.

27. A method of controlling light beam intensity distribution in a laser drilling system comprising:
 determining an intensity distribution of a plurality of sub-beams provided by a source of sub-beams;
 constructing a microfilter based on the intensity distribution; and
 positioning the constructed microfilter within an optical path of the plurality of sub-beams.

28. The method of claim 27, wherein said determining an intensity distribution of a plurality of sub-beams corresponds to measuring the intensity distribution of the plurality of sub-beams.

29. The method of claim 27, wherein said determining an intensity distribution of a plurality of sub-beams corresponds to calculating the intensity distribution of the plurality of sub-beams.

30. The method of claim 27 further comprising designing the microfilter based on the determined intensity distribution of the plurality of sub-beams.

31. The method of claim 30 further comprising determining a number of levels and appropriate transmission values for equalizing the beam intensities.

32. The method of claim 31 further comprising sorting the intensities of the beams into bins.

33. The method of claim 32 further comprising determining an array layout based on the sorted beam intensities.

34. The method of claim 33 wherein said constructing is based on the determined array layout.

35. The method of claim 27, wherein said positioning corresponds to aligning the constructed microfilter proximate to a focal plane of a scan lens intersecting the optical path, thereby ensuring that the sub-beams are separate from one another while having a spot size sufficiently large to avoid damage to the constructed microfilter.

36. The method of claim 27 further comprising determining an intensity distribution of a plurality of sub-beams exiting the constructed and positioned microfilter.

37. The method of claim 36, wherein said determining an intensity distribution of a plurality of sub-beams exiting the constructed and positioned microfilter corresponds to measuring light intensity of the plurality of sub-beams exiting the constructed and positioned microfilter.

38. The method of claim 36, wherein said determining an intensity distribution of a plurality of sub-beams exiting the constructed and positioned microfilter corresponds to examining results of ablation of a workpiece via the plurality of sub-beams exiting the constructed and positioned microfilter.

39. The method of claim 36 further comprising:
 constructing a new microfilter based on the determined intensity distribution of the plurality of sub-beams exiting the constructed and positioned microfilter; and
 replacing the constructed and positioned microfilter with the new microfilter.

40. A method of designing a microfilter to control beam intensity, the method comprising:
 determining an intensity distribution of a plurality of sub-beams provided by a source of sub-beams;
 calculating transmission values of partially transmissive filters for individual beams; and
 designing the physical layout of the microfilter.

41. The method of claim 40 further comprising predetermining a number of discrete transmission values.

42. The method of claim 41 further comprising binning the transmission values based on the predetermined number of discrete transmission values.

43. The method of claim 42 wherein said designing the physical layout of the microfilter is based on the binned transmission values.

44. The method of claim 40, wherein said determining an intensity distribution of a plurality of sub-beams corresponds to calculating the intensity distribution of the plurality of sub-beams.

45. The method of claim 40, wherein said determining an intensity distribution of a plurality of sub-beams corresponds to measuring the intensity distribution of the plurality of sub-beams.

46. The method of claim 40 further comprising:
 constructing the designed microfilter;
 aligning the constructed microfilter;
 determining an intensity distribution of a plurality of sub-beams exiting the aligned micro-filter; and
 designing a new microfilter based on the determined intensity distribution of sub-beams exiting the aligned micro-filter.

47. The method of claim 46, wherein said determining an intensity distribution of a plurality of sub-beams exiting the aligned microfilter corresponds to measuring light intensity of the plurality of sub-beams exiting the aligned microfilter.

48. The method of claim 46, wherein said determining an intensity distribution of a plurality of sub-beams exiting the aligned microfilter corresponds to examining results of ablation of a workpiece via the plurality of sub-beams exiting the aligned microfilter.

49. An apparatus for controlling light beam intensity, the apparatus comprising:
 a substrate further including:
  a) a plurality of optical coatings; and
  b) a plurality of partially transmissive filters.

50. The apparatus of claim 49, wherein said substrate is further defined as a transparent material operable to pass light with a minimal loss of energy.

51. The apparatus of claim 49, wherein said plurality of optical coatings comprises a high-reflectivity dielectric thin-film coating applied to a side of said substrate upon which said plurality of partially transmissive filters is situated.

52. The apparatus of claim 49, wherein said plurality of optical coatings comprises:
 an opaque thin-film metal coating applied to a side of said substrate upon which said plurality of partially transmissive filters is situated; and
 an anti-reflective dielectric thin-film coating applied to an opposite side of said substrate.

53. The apparatus of claim 49, wherein said plurality of partially transmissive filters match a beam strength pattern of a diffractive optical element of the provided source of sub-beams, thereby providing intensity equalization of sub-beams exiting the diffractive optical element.

54. A method for correcting reflection angles from a PZT scan mirror comprising:
    calculating a reflection correction measure based on an incident angle;
    incorporating the reflection correction measure into a tool path algorithm; and
    operating the scan mirror with reflection correction to a tool path of the tool path algorithm.

55. The method of claim 54 further comprising determining the incident angle.

56. The method of claim 55, wherein the incident angle is a function of a tilting angle, and wherein said determining the incident angle is further defined as determining the tilting angle.

57. The method of claim 56, wherein the measure is further defined as a factor for modifying a tipping angle.

58. The method of claim 57, wherein the factor is further defined as a cosine of the determined incident angle.

59. A method for correcting hysteresis effect in a PZT scan mirror comprising:
    calculating a hysteresis correction measure based on a determined voltage response for a drilling run;
    incorporating the hysteresis correction factor into a tool path algorithm; and
    operating the scan mirror with hysteresis correction to a tool path of the tool path algorithm.

60. The method of claim 59 further comprising determining a voltage response for the drilling run based on a generated voltage history.

61. The method of claim 60 further comprising generating a voltage history in a PZT scan mirror.

62. The method of claim 61, wherein said generating a voltage history is further defined as creating a hysteresis curve.

63. The method of claim 62, wherein said generating a voltage history comprises:
    starting at an origin of the hysteresis curve;
    increasing and decreasing a drive voltage to the PZT scan mirror; and
    achieving maximum and minimum voltages for the drilling run at least once.

64. The method of claim 63, wherein said determining a voltage response for the drilling run based on a generated voltage history is further defined as measuring voltage response at discrete drive voltages, thereby determining inverse functions at discrete deflection angles.

65. The method of claim 64 further comprising performing linear interpolation between adjacent angles to complete the hysteresis curve without direct measurements.

66. The method of claim 65, wherein the hysteresis correction measure is further defined as a factor for modifying drive voltage to counteract imbalance between deflection angles.

67. The method of claim 66, wherein the factor f is calculated by taking a difference square root of a deflection ratio $$\frac{\theta(V_o + \Delta V_M)}{\theta(V_o - \Delta V_M)},$$

wherein the deflection ratio $$\frac{\theta(V_o + \Delta V_M)}{\theta(V_o - \Delta V_M)}$$

is based on a voltage at the origin of the hysteresis curve $V_o$ and a maximum voltage $V_M$ according to:

$$f = 1 - \sqrt{\frac{\theta(V_o + \Delta V_M)}{\theta(V_o - \Delta V_M)}}.$$

68. The method of claim 67, wherein said incorporating the hysteresis correction factor into a tool path algorithm is further defined as calculating a drive voltage $V_S$ based on an original voltage V and a change in the maximum voltage $\Delta V_M$ according to:

$$V_s = 1 - f \cdot \frac{V}{\Delta V_M}.$$

69. The method of claim 67, wherein said incorporating the hysteresis correction factor into a tool path algorithm is further defined as calculating a drive voltage $V_l$ based on an original voltage V according to:

$$V_l = \frac{V}{1 - f \cdot \frac{V}{\Delta V_M}}.$$

70. The method of claim 66, wherein the hysteresis correction measure is improved by an additional iteration.

71. The method of claim 62, wherein the hysteresis curve is generated based on a lookup table having discrete hysteresis coordinates stored therein.

72. The method of claim 71 wherein said determining a voltage response for the drilling run based on a generated voltage history corresponds to looking up voltage response at discrete drive voltages using the lookup table, thereby determining inverse functions at discrete deflection angles.

73. The method of claim 72 further comprising performing linear interpolation between adjacent angles to complete the hysteresis curve without direct measurements.

74. A method for operating a PZT scan mirror comprising:
    calculating a reflection correction measure based on an incident angle;
    calculating a hysteresis correction measure based on a determined voltage response for a drilling run;
    incorporating the reflection correction measure and hysteresis correction measure into a tool path algorithm; and
    operating the scan mirror with reflection correction and hysteresis correction to a tool path of the tool path algorithm.

75. A laser micromachining system comprising:
    a picosecond laser operable to produce a laser beam to illuminate a workpiece;
    a beam path describing a route of the laser beam from said picosecond laser to the workpiece;
    a scan mirror intersecting the beam path and operable to guide the laser beam to achieve a desired shape in the workpiece;

a diffractive optical element intersecting the beam path and operable to diffract the laser beam, thereby producing a plurality of sub-beams illuminating a workpiece;

a scan lens intersecting the sub-beams and operable to determine a spot size of the sub-beams upon the workpiece;

a microfilter intersecting the sub-beams and operable to equalize an intensity distribution of the sub-beams; and a control module operable to:

a) calculate a reflection correction measure based on an incident angle;

b) calculate a hysteresis correction measure based on a determined voltage response for a drilling run;

c) incorporate the reflection correction measure and hysteresis correction measure into a tool path algorithm; and d) operate said scan mirror with reflection correction and hysteresis correction to a tool path of the tool path algorithm.

* * * * *